United States Patent
Sohail et al.

(10) Patent No.: US 11,395,992 B2
(45) Date of Patent: Jul. 26, 2022

(54) HOLLOW FIBER MEMBRANE FOR FILTRATION OF LIQUIDS

(71) Applicant: Pak Vitae (Private) Limited, Lahore (PK)

(72) Inventors: Shayan Sohail, Lahore (PK); Arslan Ahmed, Lahore (PK); Hafiz Usama Tanveer, Lahore (PK)

(73) Assignee: Pak Vitae (Private) Limited, Lahore (PK)

( * ) Notice: Subject to any disclaimer, the term of this patent is extended or adjusted under 35 U.S.C. 154(b) by 0 days.

(21) Appl. No.: 16/893,355

(22) Filed: Jun. 4, 2020

(65) Prior Publication Data

US 2020/0306699 A1    Oct. 1, 2020

Related U.S. Application Data

(62) Division of application No. 16/400,963, filed on May 1, 2019, now Pat. No. 11,148,100.

(30) Foreign Application Priority Data

May 3, 2018    (PK) .................................... 319/2018
Oct. 1, 2018    (GB) .................................... 1816030

(51) Int. Cl.
    *B01D 69/12*    (2006.01)
    *B01D 69/02*    (2006.01)
    (Continued)

(52) U.S. Cl.
    CPC .......... *B01D 69/02* (2013.01); *B01D 63/024* (2013.01); *B01D 69/087* (2013.01); *B01D 69/12* (2013.01);
    (Continued)

(58) Field of Classification Search
    CPC .... B01D 69/02; B01D 63/024; B01D 69/087; B01D 69/12; B01D 69/141; B01D 71/52;
    (Continued)

(56) References Cited

U.S. PATENT DOCUMENTS 4,435,289 A    3/1984  Breslau
4,636,307 A    1/1987  Inoue et al.
(Continued)

FOREIGN PATENT DOCUMENTS

CN    106310980 A  *  1/2017
EP    0938367 B1      1/2004
(Continued)

OTHER PUBLICATIONS

Persson K.M. et al., "Study of membrane compaction and its influence on ultrafiltration water permeability", Journal of membrane science 100, No. 2: 155-162 (1995).
(Continued)

*Primary Examiner* — Waqaas Ali
(74) *Attorney, Agent, or Firm* — Merchant & Gould P.C.

(57) ABSTRACT

The present invention provides an intrinsically anti-microbial hollow fiber membrane for filtration of liquids. The membrane comprises a plurality of porous hollow bilayer membrane fibers wherein the liquid enters from outside of the fiber, passing through the porous membrane into the lumen of the fiber and coming out from the hollow ending of the fiber, wherein this configuration provides a liquid outside-in arrangement and retains the filtrate outside. It means that membrane of the invention has built in characteristics to act against microbes in order to provide the use with a safe liquid free from microbes. The outer side or outer wall of the hollow fibers may be configured to become hydrophobic whereas inner side or inner wall of the hollow fiber membrane may be configured to become hydrophilic to
(Continued)

enhance the water permeability to a great extent. The hollow fiber membrane may be configured to give it an intrinsic anti-microbial capability. A device containing above said membrane has also been disclosed.

4 Claims, 14 Drawing Sheets

(51) Int. Cl.
B01D 63/02 (2006.01)
B01D 69/08 (2006.01)
B01D 69/14 (2006.01)
B01D 71/52 (2006.01)
B01D 71/68 (2006.01)

(52) U.S. Cl.
CPC .......... B01D 69/141 (2013.01); B01D 71/52 (2013.01); B01D 71/68 (2013.01); B01D 2325/02 (2013.01); B01D 2325/36 (2013.01); B01D 2325/38 (2013.01); B01D 2325/48 (2013.01)

(58) Field of Classification Search
CPC ............. B01D 71/68; B01D 2325/02; B01D 2325/36; B01D 2325/38; B01D 2325/48; B01D 71/44; B01D 67/0079; B01D 69/08; B01D 71/024; B01D 71/022; B01D 2323/12; B01D 2323/18; B01D 2323/21; B01D 2323/40; B01D 65/08; B01D 67/0011; B01D 69/148; B01D 63/021; B01D 61/00; B01D 67/0002; B01D 2323/02; B01D 63/02; B01D 37/025; B01D 71/28; B01D 71/06; C02F 1/444; C02F 1/505; C02F 2303/04; C02F 1/44; A47G 21/188
See application file for complete search history.

(56) References Cited

U.S. PATENT DOCUMENTS

| 5,160,673 A | 11/1992 | Wollbeck et al. |
| 7,390,343 B2 | 6/2008 | Tepper et al. |
| 8,852,439 B2 | 10/2014 | Frauchiger et al. |
| 9,200,086 B2 | 12/2015 | Wan et al. |
| 9,527,918 B2 | 12/2016 | Fiori et al. |
| 2004/0078625 A1 | 4/2004 | Rampuria et al. |

FOREIGN PATENT DOCUMENTS

| EP | 2235502 B1 | 6/2019 |
| WO | 2008/101172 A2 | 8/2008 |

OTHER PUBLICATIONS

Bacchin P. et al., "Critical and sustainable fluxes: theory, experiments, and applications", Journal of Membrane Science 281, No. 1-2: 42-69 (2006).

C.S. Feng, B. Shi, G. Li, Y. Wu, Preparation and properties of microporous membrane from polyvinylidene fluoride cotetrafluoroethylene) (F2.4) for membrane distillation, J. Membr. Sci. 237: 15-24 (2004).

World Health Organization "What is schistosomiasis?", https://www.who.int/sistosomiasis/disease/en/, retrieved May 21, 2020.

Working Paper on Formulation of a National Drinking Water Policy (2005).

* cited by examiner

HOLLOW FIBER MEMBRANE FOR FILTRATION OF LIQUIDS

This application is a Divisional of U.S. patent application Ser. No. 16/400,963, filed May 1, 2019, which claims benefit of Patent Application No. 319/2018, filed May 3, 2018 in Pakistan, Patent Application Nos. 1816030.9, filed Oct. 1, 2018 and 1906074.8, filed Aril 30, 2019 in Great Britain, which applications are incorporated herein by reference. To the extent appropriate, a claim of priority is made to each of the above disclosed applications.

FIELD OF INVENTION

The present invention is in the field of liquid filtration, for example, those using hollow fiber membrane modules having intrinsic anti-microbial properties with an outside-in liquid flow configuration. The membrane can find utility in portable water filtration devices through the multipurpose housing that works directly under suction pressure or passage pressure or gravitational head of liquid. In particular, the exemplary embodiments of the present invention also relate to the hydrophobic outer side or outer wall of hollow fibers and the hydrophilic inner wall of the hollow fiber membrane having excellent water permeation performance for a prolonged period of time without any backwashing.

BACKGROUND OF INVENTION

Pure drinking water has always been a big issue for people all around the globe. 663 million people rely on unimproved water sources, including 160 million people depending on surface water. Globally, at least 2.1 billion people use a drinking-water source contaminated with feces. Contaminated water can transmit diseases such as diarrhea, cholera, dysentery, typhoid, and polio. Some 842,000 people are estimated to die each year from diarrhea because of unsafe drinking water, sanitation and hand hygiene. Diarrhea is largely preventable, and the deaths of 361,000 children aged under 5 each year could be avoided each year if these risk factors were addressed. Almost 240 million people are affected by schistosomiasis an acute and chronic disease caused by parasitic worms contracted through exposure to infested water as per WHO reports.

In Pakistan, 44% of the population has complete inaccessibility to pure drinking water throughout their lives. In 2015, 311 children died only in Thar due to the scarcity of clean water. In Khyber Pakhtunkhwa (KPK) and the Federally Administered Tribal Areas (FATA), 40% of deaths occur due to water-borne diseases. Every minute, a child dies in Pakistan due to contaminated water. 1 million Diarrhea cases are reported every year in Pakistan. Pakistan is currently spending 1.3 billion dollars on waterborne disease elimination every year. Per WHO, 25-30% of Pakistanis admitted to hospitals are due to waterborne bacteria and 60% of total infant deaths are due to contaminated water.

Clean water is a big problem at household as well as individual level. For people on the move, clean drinking water has become an expensive resource. A requirement of a device that can filter any available water on-the-spot is the need of the time. On average, more than 70% of fresh available water is contaminated and hence not safe to drink. The current technologies used are either expensive, not-portable, require power or are short-lived.

During natural or other disasters, emergency, or major incidents, the rescue departments or military use either disinfectant medicines, coagulant tablets, or if possible, they install a water filtration plant. The first two are inefficient and unreliable as they have known harmful effects on the human body, whereas the last one is expensive and clean water transportation is difficult as well.

The conventional water filtration membranes require power to pump water through the membrane. These membranes have undefined or larger pore sizes, which normally results in the escape of biological contamination into the purified water side of the membrane. Hence, most of the conventional membrane-based water filtration solutions are either equipped with UV light, Ozonation or Chlorination units (disinfectants). The prior two require high energy whereas the last one has carcinogenic effects on humans.

Filters based on sand/granite/charcoal/adsorbents beds have low processing speed, are heavy in weight, have a low processing capacity, and low level of efficiency in removal of biological contamination (especially viruses). In order to provide filtered water on a mass scale, a large setup is required and a frequent change of adsorbent is required to maintain filtration speed. A post-processing unit is also required to remove biological contamination in this case.

The ceramic membranes now used in portable water filtrations units lack durability. They are prone to damage when they face an impact, are heavier in weight, and require high temperatures for manufacturing. It is also difficult to maintain a pore size in such membranes that can remove biological contamination efficiently. The sintering process used to produce such ceramics is not commercially well established to reduce pore size below 20 nm.

Hollow fiber membranes are widely employed in the domestic and industrial sector for the microfiltration and ultrafiltration applications. During the passage of water from one side of the membrane to the other, filtration process occurs by selectively allowing only the water molecules and those particles which are considerably smaller than the surface pore size of the membrane. Hence, the surface of the membranes specifically and the whole fiber thickness, in general, form a boundary which is separating the unfiltered water from the filtered water. Polyethylene, cellulose acetate, polysulfone, polyvinylidene fluoride, polycarbonate, polyacrylonitrile, etc. are used as materials for forming the fibers of the membranes. This method requires that the porous hollow fibers have high porosity and narrow pore size distribution to improve separation efficiency and separation accuracy. Moreover, it also required that the membranes possess a pore size that is most suitable for separation targets, and the characteristics of effectively excluding bacteria, suspension solids, and turbid components. Meanwhile, the fibers of the membranes shall have higher mechanical strength and high water flux such that they can sustain long-term use under conditions required for chemically cleaning polluted membranes and for high operational pressures. Since such conventional hollow fiber membranes made of these materials have been developed and used for the purpose of improving filtration performance, certain inadequacies have been identified. For example, these conventional hollow fiber membranes provide only a low-level processing performance, need backwashing and may get contaminated with bacteria and other microorganisms.

Various failed attempts have been made for a solution to these problems, including suggestions to increase porosity. Thus, hollow fiber membranes that provide a well-balanced water permeation performance with micro biocidal properties and with a long life have not yet been obtained.

Currently, the following three filtration techniques are used in the water filtration industry: I) Ultrafiltration (UF) 2) Nano Filtration 3) Reverse Osmosis Filtration. Most commonly, for freshwater resources, UF membranes are in use. The currently available hollow fiber based portable liquid filtration membranes are based on UF technology and hence, cannot efficiently remove dissolved metals such as Arsenic, chromium, Iron, etc. In order to achieve the removal of these metals, a pore size below 2 nm is required.

On the other hand, whilst a method of increasing the pore diameter of a membrane is generally employed for improving the water permeation performance of a membrane, this increase in pore diameter generally causes a deterioration in the fractionation performance of the membrane and in the strength of the membrane.

Hollow fiber membrane modules are commonly used for microfiltration and ultrafiltration of water, such modules being used in various scales; from large commercial scale plants to portable water filters. One of the known hollow fiber module configurations for water filters is disclosed in U.S. Pat. No. 4,435,289, where porous hollow fibers are sealed using hardened resin located at both ends of the fibers which also act as support. Water enters the fibers from the openings at the supported ends into the inner volume and is filtered when it passes through the micro pores of the hollow fiber walls. This is an inside-out flow, where the clean water moves out from the lumen of the fibers and the filtrate accumulates on the inner side of the fibers. Such fibers are cleaned by forwarding flushing water through the inner volume of the fibers, possibly combined with a backflush as disclosed in WO 2008/101172 by Vestergaard Frandsen.

This principle is also explained with a concept of personal drinking straws, such as in EP 22355 02B 1. This device contains a mouthpiece used for suction of water through the straw containing a bundle of U-shaped hollow fibers with microporous membrane walls, which are supported with both ends sealed in a head just below the mouthpiece. When the human mouth creates the suction, the flow is from outside to inside. The filtrate remains outside the membrane walls, and clean water enters the inner volume of the fibers through microporous walls. This clean water is then released from the sealed ends near the mouthpiece for drinking purpose.

This device disclosed in EP 2235502B 1 faces a general problem encountered with such filters; that is, the hollow fibers are made of a hydrophilic material able to transport water efficiently through the membranes and to which a non-slippery water layer is formed on the membranes. Due to this phenomenon, the air cannot, or only hardly can, travel across the membrane walls when these membranes are wet (i.e. when they are being used to filter water). This results in a risk of air trapping in the volume around the fibers, which decreases the water flow, as the trapped air prevents an efficient water flow through the membranes. Due to this, a higher suction pressure is required by a human to obtain an optimum flow from the modules.

This problem is very common in such filtration devices and solutions to this problem have been proposed earlier, as disclosed in the above-mentioned U.S. Pat. No. 4,636,307 several hydrophobic fibers are added in the module to repel water that forms a non-slippery layer around the fibers and prevent the air passage. However, with respect to production, this solution is complicated and expensive.

Another configuration instead of using a U-shaped hollow fiber membrane module, uses a module that extends into an upstream chamber, the fibers have an open end supported and sealed in a head and are closed and extending into an upstream water chamber, as disclosed in EP 0938367 and as also mentioned in EP 2235502B 1. The principle is analogous to the one just described and encounters the same problem.

A different form of configuration is disclosed in US 2004/078625, where two U-shaped membrane modules are housed in a single pipe and the bent arc parts facing each other. The water flows inside-out from the first module whose open ends are supported and sealed at the suction piece of the straw. The clean water enters the chamber between two modules and then flows outside-in from the second U-shaped module whose open ends are supported and sealed near the mouthpiece. This system is prone to air accumulation in the chamber between the two modules which can result in reduced water flow rate or higher requirement of suction pressure.

In contrast to the above configuration, a method is disclosed in U.S. Pat. No. 8,852,439 B2, where a single U-shaped hollow fiber module is used in order to avoid air trapping with all hydrophilic fibers. The open ends are supported and sealed near the suction piece and the bent faces the mouthpiece. This is reversely configured compared to EP 2235502 B 1. This configuration is claimed to have a reduced risk of air trapping as the volume inside the fibers is much smaller than the volume of the compartment. The water follows an inside-out flow pattern. The cleaning of the accumulated filtrate is done by blowing air from the mouth which results in backflushing.

The inside-out flow through the hollow fiber membrane as disclosed in U.S. Pat. No. 8,852,439 B2 causes the coarse particles to get stuck inside the hollow fibers of the membrane. These particles increase the requirement of suction pressure or passage pressure or gravitational head with time and use. This extra suction pressure or passage pressure or gravitational head along with stuck coarse particles causes cracks in the fiber walls.

These hollow fiber membrane-based filters face a common problem. Bacteria enter the filter body and hollow fibers, for example when air is blown from the mouth for backflushing, when back-washing occurs using an external component, by exposure of the clean side to bacteria, due to poor sanitation, or due to an unclean environment. These bacteria stick with the walls and fibers and start to grow in colonies. These bacterial colonies grow on the filtered water side of the membrane as air is blown through mouthpiece of the filter or by back-washing using external component or by exposure of clean side to bacteria or due to poor sanitation or due to an unclean environment. This results in contamination of filtered liquid, and hence a failure to filter.

In order to tackle this problem, a method is disclosed in U.S. Pat. No. 8,852,439 B2. A bacteriostatic/biocidal layer is applied in the inner walls of the filter so the bacteria do not grow and hence the filtered water is not contaminated. However, the problem is that this biocidal layer is only applied to filter housing (i.e. inner walls of filter body) and not on the membrane. Due to this, the membrane is prone to contamination (on the clean side). Also, this biocidal layer leaches out with erosion and hence migrates with the filtered liquid. This reduces the life of antimicrobial functionality. Biocidal materials (if leached out in outlet/filtered water) are known to have harmful effects on humans when ingested.

Another method used to mitigate the risk of bacterial growth inside the filter (e.g. due to backflushing or the exposure of clean side to bacteria or exposure to unclean environment/poor sanitation) is the use of silver Nanoparticles. Silver is an anti-microbial metal as it kills 99% of the microbes. Silver Nanoparticles leach out with time leaving larger cavities in the membrane walls which causes microbial slippage. Due to the migration of Nano silver particles, the anti-microbial effect also diminishes with time. (See U.S. Pat. Nos. 7,390,343 and 9,200,086).

In all above filtration devices, the porosity of the hollow fibers is up to 80% and so high suction pressure or passage pressure or a gravitational head is required to filter liquid, as well as air trapping becomes a concern.

SUMMARY OF THE INVENTION

It is, therefore, an object the present invention to improve the quality of filtration by introducing novel intrinsic anti-microbial characteristics to a membrane. Optionally, other objectives may be achieved by the present invention, for example increasing the water flux so that air trapping is no more a problem and clogging of the membrane holes via air bubbles is reduced to the minimum extent; to reduce the suction pressure or passage pressure or gravitational head requirement of the hollow fibers for water filtration. In particular, the aim of the invention is to achieve better quality filtered water with a higher flow rate and lesser suction pressure or passage pressure or gravitational head.

The inventors have surprisingly found that one can provide a novel membrane which has inherent antimicrobial properties. This can be used in multiple purpose portable housings with multiple openings wherein liquids, such as water, flows outside-in through membrane fibers. It means that the membrane of the invention has built-in characteristics to act against microbes in order to provide a safe liquid, such as water, free from microbes.

Another object of the present invention is to provide a method for producing such a hollow fiber membrane, such a membrane may have a high level of strength and excellent in fractionation performance and water and other liquids permeation performance.

Accordingly, in a first aspect of the present invention, there is provided an intrinsically anti-microbial hollow fiber membrane for filtration of liquids comprising a plurality of porous hollow membrane fibers wherein the liquid enters from outside of the fiber membrane and passes through the porous membrane into and along the lumen of the fibers, thereby retaining the filtrate outside of the membrane and filtered liquid flows out from the hollow end of the fiber.

The hollow fiber membrane of the present invention may be characterized in that the outer surface or outer wall of the hollow fiber has hydrophobic characteristics whereas the inner surface or inner wall of membrane possess hydrophilic characteristics.

The hollow fiber membrane of the present invention may have a pore size range from 0.1 nano meter to 25 nano meter.

The hollow fiber membrane may have a fiber diameter ranging from 0.2 mm to 0.6 mm.

The hollow fiber membrane may have a wall thickness from 1 mm to 2 mm.

The hollow fiber membrane of the present invention may be characterized in that the outer surface or outer wall of the hollow fiber has hydrophobic characteristics whereas inner surface or inner wall of membrane possess hydrophilic characteristics having pore size range from 0.1 nano meter to 25 nano meter with fiber diameter ranging from 0.2 mm to 0.6 mm and wall thickness equal to 1 mm to 2 mm.

The hollow fibers may be formed from a polymer, optionally a thermosetting polymer. For example, the fibers may be formed from polysulfone polymers, polyethersulfone, polyvinylidene fluoride polymers, polyacrylonitrile polymers, polymethacrylic acid polymers, polyamide polymers, polyimide polymers, polyether imide polymers, and cellulose acetate polymers, or mixtures thereof. Optionally the fibers may be formed form aromatic polysulfones, polyacrylonitrile copolymers, polyvinylidene fluoride, and aromatic polyetherimides, or mixtures thereof. The inventors have found that the choice of polymers, and polymer mixes, can influence the pore formation and so the Pure Water Permeability (PWP) and Critical Water Flux (CWF). The formation of a large number of pores over a given area of fiber wall, and so a large % void by volume of the fiber wall, can be achieved by selection of polymers to construct the fibers. For example, the fibers comprise or consist of from 16% to 25% by weight, polyethersulfone, of from 5 to 20% by weight polyvinylpyrrolidone, of from 70% to 90% by weight, N-methyl pyrrolidone solution and of from 10% to 45% by weight polyethylene glycol. Optionally the fibers also comprise polycarbonates, polyamides, and aqueous isopropyl or any combination thereof. For example, the fibers comprise or consist of from 10%-25% by weight polysulfone and from 5% to 15% by weight polyvinyl pyrrolidone. For example, the fibers comprise or consist of from 3%-25% by weight polyethersulfone and from 5% to 15% by weight polyvinylpyrrolidone.

The fibers may comprise or consist of polyethersulfone, optionally Ultrason® polyethersulfon, optionally grade 6020p. For example, the fibers comprise or consist of from 12% to 25%, polyethersulfone, of from 40% to 85%, N-methyl pyrrolidone and of from 10% to 45% polyethylene glycol. Such a formulation may also include lithium chloride (optionally of from 0.3 to 1.5%).

The fibers may be provided in a number of confirmations. For example, the fibers may form a one-layer membrane, the fibers may form a membrane comprising more than one layer, the fibers may form a membrane that is a double layer (for example, involving two u-shaped sets of fibers provided opposed to each other within a closed system).

The multiple layers may permit different characteristics to be presented from each layer.

A single layer membrane can be either hydrophobic or hydrophilic. A double layer membrane can be either hydrophobic or hydrophilic. The outer side or wall of the membrane layer (ie the side facing the liquid to be filtered) can be hydrophobic and the inner side layer or wall (ie the side facing the lumen of each fiber and containing filtered liquid) is hydrophilic. The hydrophobic layer reduces the requirement of air trappings and suction pressure. The hydrophobic layer increases the liquid flux.

The hydrophilic layer allows maintenance of capillary action of the liquid through the pores on fiber walls towards the hollow cavity of fibers and decreases the requirement of suction pressure or passage pressure or gravitational head.

The liquid may flow with outside-in orientation (ie liquid to be filtered is provided outside of the fiber lumen, passing inside of the lumen when being filtered). Alternatively, the liquid may flow with inside-out orientation.

In an outside-in orientation, the filtrate is retained outside of the membrane.

For ease of maintenance, the membrane may be washable.

The fibers that define the membrane have pores in their walls through which water can pass. The multiple pores can result in a fiber being formed that has a void range of from 70 to 90% or 80% to 90% void by volume of fiber wall. The pore size can range from 0.1 nm to 25 nm in diameter. For usage under suction, the pore size can range from 50 nm to 150 nm in diameter. The combination of porosities used in this invention unique because by doing so the mechanical strength of the fiber is not compromised, which becomes a concern when higher porosities are achieved in order to achieve higher fluxes.

The fibers of the membrane of the present invention may have a PWP (Pure Water Permeation) of greater than 1800 Lmh (Liters per meter square area of membrane per hour under one bar pressure) and/or a CWF (Critical Water Flux) of greater than 900 Lmh.

The hollow fibers can form a U-shaped membrane module with open ends where liquid entered in the membrane for filtration and filtered liquid comes out through the open ends of fibers. For example, as described in U.S. Pat. No. 5,160,673.

The fibers are preferably intrinsically antimicrobial in nature. This means that they are not simply coated with an antimicrobial substance. As a result, the antimicrobial nature of the membrane does not easily become dislodged to be ingested by the user. This may be achieved by an antimicrobial substance being embedded within the polymer system that forms the fibers. The antimicrobial substance may be embedded by being physically trapped within the cross-linking between the polymeric chains. The antimicrobial substance may be chemically bonded within the cross-linked polymeric chains. The embedding of the antimicrobial substance within the polymer results in the formation of anti-microbial substance embedded polymer.

The antimicrobial substance may be metal, metal salt or a metal oxide having antimicrobial properties. For example, the substance may be zinc oxide, zinc or zinc salt. Thus, as an example, the fibers of the present invention may be rendered intrinsically antibacterial by adding at least one zinc salt to a solution or dispersion, in an aqueous or organic solvent, of the monomers used to synthesize the polymer that forms the fiber. Alternatively, at least one antimicrobial substance (eg a zinc salt) can be added during the reaction of polymerization of the starting monomers.

When a zinc salt is used to modify the polymer in order to render it intrinsically antibacterial, the salt may comprise or consist of any one or combination of PCA (zinc salt of pyrrolidone carboxylic acid), zinc oxide, zinc hydroxide, zinc pyrrolidone, and zinc pyrithione.

The polymer or polymer mix into which the antimicrobial substance is embedded can be any one or combination of those provided above for forming the fiber. For example, the polymer may be Polyethersulfone, or a polymer mix comprising Polyethersulfone.

The antibacterial polymer of the invention may be characterized in that has a release of zinc ions that is below the legal limits of 21 ppm.

The antibacterial polymer of the invention is effective for controlling or eliminating the bacterial proliferation of Gram− and Gram+ bacteria, e.g. *Escherichia coli* (Gram−) and/or *Staphylococcus aureus* (Gram+). Other examples can be selected from *Escherichia coli, Staphylococcus aureus, Pseudomonas aeruginosa, Acinetobacter baum, Ent. bloacae, C. albicans,* and *Clostridium* species, or combinations thereof.

In order to limit the amount of costly antimicrobial substance, and any residual loss of antibacterial substance into the filtered water, the entire fiber does not have to be formed form an antimicrobial embedded polymer. Substantially all of the externally facing surface of each fiber may include an anti-microbial substance within the substance of the polymer or polymer mix that forms the fiber. The modified polymer is mixed in such a way that 99% of the whole surface area of the membrane is antimicrobial in nature. The mixing is done through a process which ensures that even when in a small amount for instance 2.5 to 3% of the modified polymer is mixed with the rest of the polymeric mixture, 99% of the membrane surface area of the newly manufactured/spun membrane holds property of being intrinsically anti-microbial. Hence the fibers are antimicrobial from the outside as well as inside.

The antimicrobial substance may be a metal oxide or metal. It may be particles of metal or metal oxide. The anti-microbial substance embedded polymer or polymer mix may be from 2-5% by weight of the fiber. The polymer or polymer mix absent of anti-microbial substance may be from 95-98% by weight of the fiber. The polymer or polymer mix with and absent of the anti-microbial substance may be the same polymer or polymer mix.

The method of forming such membrane as discussed above can result in the inherent formation of a fiber with the characteristics discussed above.

For example, the inventors have found that one can provide a high % void volume in the fiber wall by selecting an appropriate pore former as part of the process of manufacture of the fibers.

Consequently, in a further aspect of the present invention, there is provided a process of making an intrinsically anti-microbial hollow fiber membrane comprising the steps of:— a) mixing polymer or a polymer mix with a pore former comprising PEG (Molecular weight-300);

b) passing the mixture produced in step a) through a spinneret together with a non-solvent for the polymers.

The polymers or polymer mix may be selected from any of those proposed for constructing the fibres in the first aspect of the present invention. Consequently, as an example, the fibres may comprise or consist of from 12% to 25%, polyethersulfone, of from 40% to 90%, N-methyl pyrrolidone and of from 10% to 45% polyethylene glycol. Such a formulation may also include lithium chloride (optionally of from 0.5 to 1.5%).

The PEG may be provided in solution; for example an aqueous solution (eg 9:1 PEG:Water solution, or +/−10% thereof).

The non-solvent used in step b) may be water.

In addition to optimizing the pore formation, the inventors have found that they are able to construct fibers with the antimicrobial property towards the external portions of the wall, but still intrinsic to the fibers; thereby conserving the substances used to provide intrinsic antimicrobial properties. Consequently, the method may comprise the steps of:

a) mixing an antimicrobial substance embedded polymer or antimicrobial substance embedded polymer mix, a polymer or a polymer mix absent of an antimicrobial substance, a solvent for both polymers or polymer mixes and a pore former comprising PEG (Molecular weight-300);

b) passing the mixture produced in step a) through a spinneret together with a non-solvent for the polymers.

In yet, a further aspect of the present invention, there is provided a process of making an intrinsically anti-microbial hollow fiber membrane comprising the steps of:— a) mixing an antimicrobial substance embedded polymer or antimicrobial substance embedded polymer mix with a polymer or a polymer mix absent of an antimicrobial substance and with a solvent for both polymers; along with other additives such as PEG, LiCl, PVP etc.;

b) passing the mixture produced in step a) through a spinneret together with a non-solvent for the polymers.

Step b) for all processes of the present invention may be carried out at a temperature of from 25 to 80° C., or 40 to 60° C., optionally 50° C. (at atmospheric pressure). The spinneret is required to operate at high speed. For example, it may operate at a speed of from 350 to 600 rpm, or from 450 to 550 rpm, optionally 500 rpm.

The polymers are more able to form a solution with the solvent than with the non-solvent. Consequently, as the solvent and non-solvent come into contact with each other during step b), the polymers are driven out of the solvent and solidify. The rapid solidification of the polymer at speed whilst being ejected by the spinneret forms pores in the created fibers. At the same time, the centrifugal forces induced by the spinneret on the forming fibers pulls the polymer with antimicrobial substance embedded therein to the outer surface of the forming fiber, this polymer being denser than that with no antimicrobial substance. In this way the fiber is formed with pores and with the outer portion of the fiber including the predominant amount of polymer with embedded antimicrobial polymer, the remainder being formed from the polymer absent from the antimicrobial substance.

This processes for both further aspects of the present invention may be used to form the membrane of the first aspect of the present invention. Consequently, all features of the first aspect of the present invention may apply equally to the further aspects of the present invention. For example, the antimicrobial substance may be a metal oxide or metal. The anti-microbial substance embedded polymer or polymer mix may be from 2-5% by weight of the total polymers in the mixture formed in step a).

The polymer or a polymer mix absent of an antimicrobial substance may form from 95-98% by weight of the fiber.

The polymer may comprise or consist of polyethersulfone, optionally. The solvent may be N-Methyl-2-pyrrolidone.

The antimicrobial substance embedded polymer may be polyethersulfon (eg Ultrason® polyethersulfon, optionally grade 6020p) and the polymer or a polymer mix absent of an antimicrobial substance is polyethersulfon (eg Ultrason® polyethersulfon, optionally grade 6020p), the polymers being provided in a 3% to 97% weight ratio.

The polymer or polymer mix with and absent of the anti-microbial substance may be the same polymer or polymer mix. The antimicrobial embedded polymer may have metal oxide particles embedded therein through cross-linking between the polymeric chains.

The membrane may be incorporated into a conventional device for liquid filtration, for example any of those described in the review of the prior art above.

Accordingly, in yet a further aspect of the present invention, there is provided a device for liquid filtration comprising a hollow fiber membrane as described in the first aspect of the present invention wherein the membrane is placed in a housing with at least one feed channel and at least one drain channel. The membrane may be placed in a housing with multiple openings for inlet, outlet, and backflush drains. The hydrophilic layer of the membrane maintains a capillary action of the liquid through the holes on fiber walls towards the hollow cavity of fibers and decreases the requirement of suction pressure or passage pressure or gravitational head.

BRIEF DESCRIPTION OF THE DRAWINGS

The present invention is now described, by way of example only, and with reference to the following figures

DETAILED DESCRIPTION OF THE ILLUSTRATED EMBODIMENTS

Figure 1:
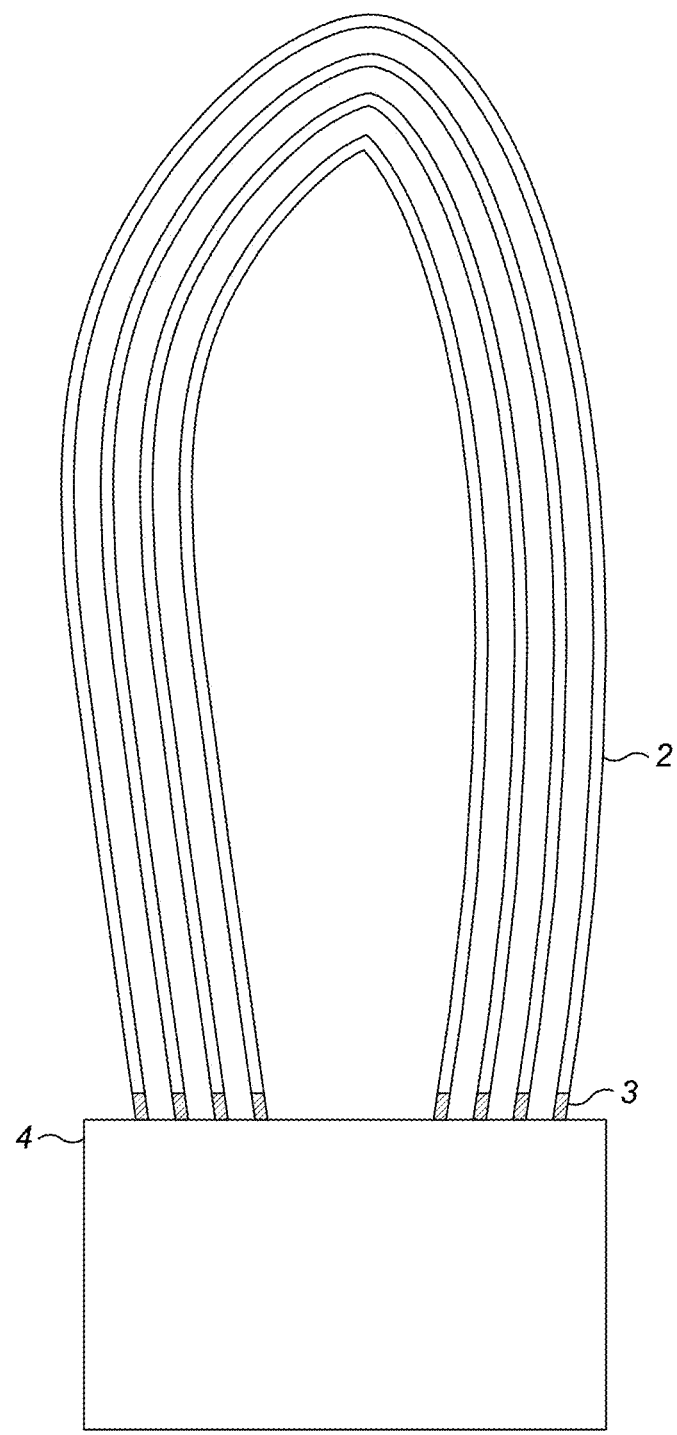
FIG. 1 depicts hollow fibers (2), fibers ends sealed and potted (3), and potting module (4).

Hereinafter, preferred embodiments of the present invention will be described in detail with reference to the accompanying drawings. The aspects and features of the present invention and methods for achieving the aspects and features will be apparent by referring to exemplary embodiments to be described in detail with reference to the accompanying drawings. However, the present invention is not limited to the exemplary embodiments disclosed hereinafter but can be implemented in various forms. The matters defined in the description, such as the detailed construction and elements, are nothing but specific details provided to assist those of ordinary skill in the art in a comprehensive understanding of the invention, and the exemplary embodiments are only defined within the scope of the appended claims. In the drawings, sizes and relative sizes of layers and areas may be exaggerated for clarity in explanation.

The term "on" that is used to designate that an element is on another element located on a different layer or a layer includes both a case where an element is located directly on another element or a layer and a case where an element is located on another element via another layer or still another element. By contrast, the term "directly on" means that an element is directly on another element or a layer without the intervention of any other element or layer. In the entire description of the present invention, the same drawing reference numerals are used for the same elements across various figures. Also, the term "and/or" includes the respective described items and combinations thereof.

Spatially relative wordings "below", "beneath", "lower", "above", "upper", and so forth, as illustrated in the drawings, may be used to facilitate the description of relationships between an element or constituent elements and another element or other constituent element. The spatially relative wordings should be understood as wordings that include different directions of the element in use or operation in addition to the direction illustrated in the drawings.

In the following description of the present invention, an exemplary embodiment of the present invention will be described with reference to plane views and sectional views which are ideal schematic views. The form of exemplary views may be modified due to manufacturing techniques and/or allowable errors. Accordingly, the exemplary embodiments of the present invention are not limited to their specified form as illustrated but include changes in the form being produced according to manufacturing processes. Accordingly, areas exemplified in the drawings have rough properties, and the shapes of areas in the drawings are to exemplify specified forms of areas of elements but do not limit the scope of the present invention.

Figure 2:
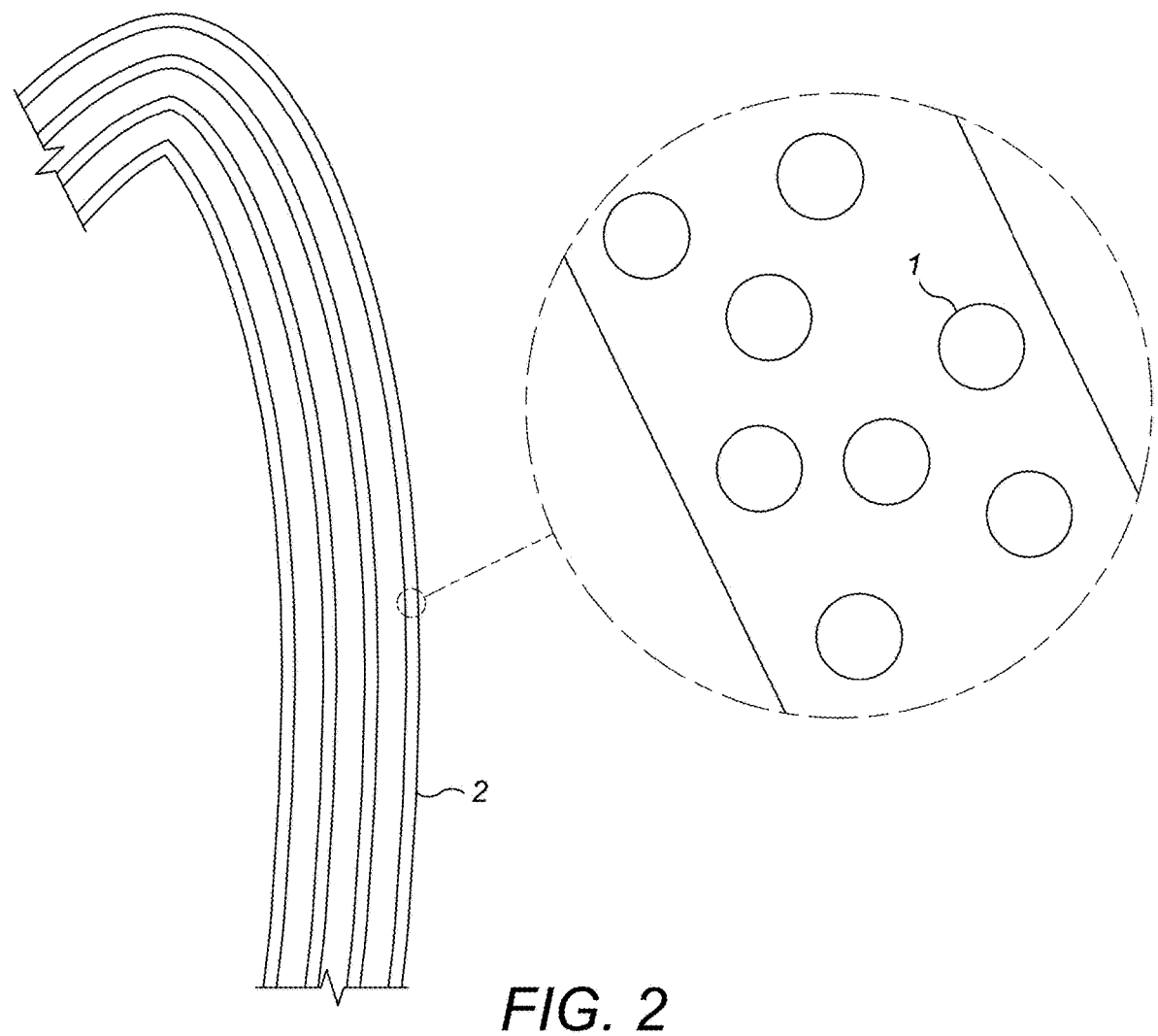
FIG. 2 depicts nano pores on a fiber wall and through which a liquid enters the lumen of the hollow fiber (1), and hollow fibers (2).

Hereinafter, A representative example of the structure of the hollow fiber filter membrane (hereinafter sometimes referred to as merely "membrane") of the present invention will be explained referring to the accompanying drawings. FIG. 1 is an enlarged photograph of a cross section perpendicular to the lengthwise direction of the membrane, and FIG. 2 is an enlarged photograph of the inner surface of the membrane.

Figure 3:
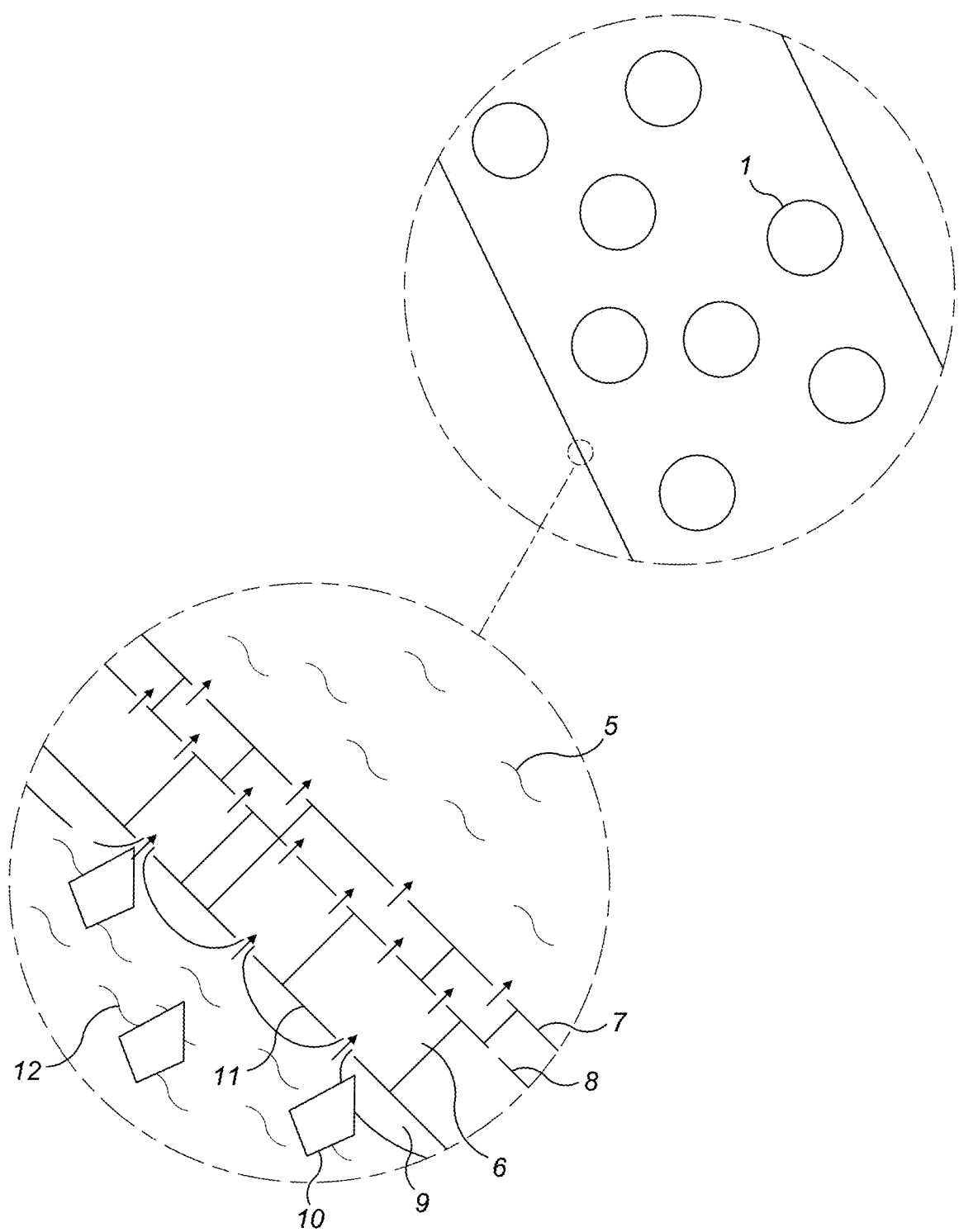
FIG. 3 depicts nano pores on a fiber wall and through which a liquid enters the lumen of the hollow fiber (1), filtered liquid (5), cavities in fiber walls (6), hydrophilic layer (7), meeting point of both layers (8), space created between liquid and fiber due to hydrophobic layer (9), coarse particles, impurities, contaminations (10), hydrophobic layer facing unfiltered liquid (11), and unfiltered liquid (12)
Figure 4:
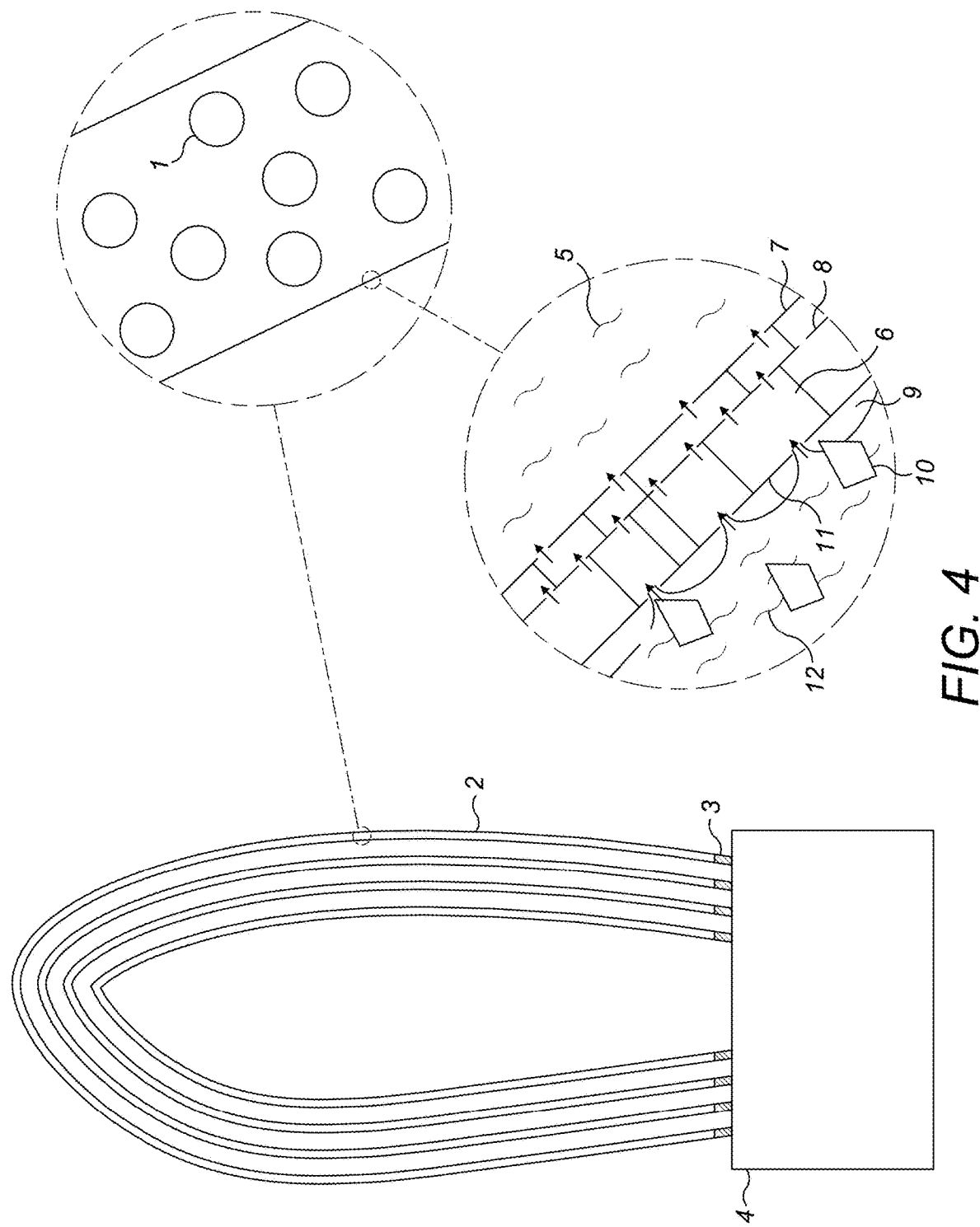
FIG. 4 depicts nano pores on fiber walls through which a liquid is entered (1), hollow fibers (2), fibers ends sealed and potted (3), potting module (4), filtered liquid (5), cavities in fiber walls (6), hydrophilic layer (7), meeting point of both layers (8), space created between liquid and fiber due to hydrophobic layer (9), coarse particles, impurities, contaminations (10), hydrophobic layer facing unfiltered liquid (11), and unfiltered liquid (12).
Figure 5:
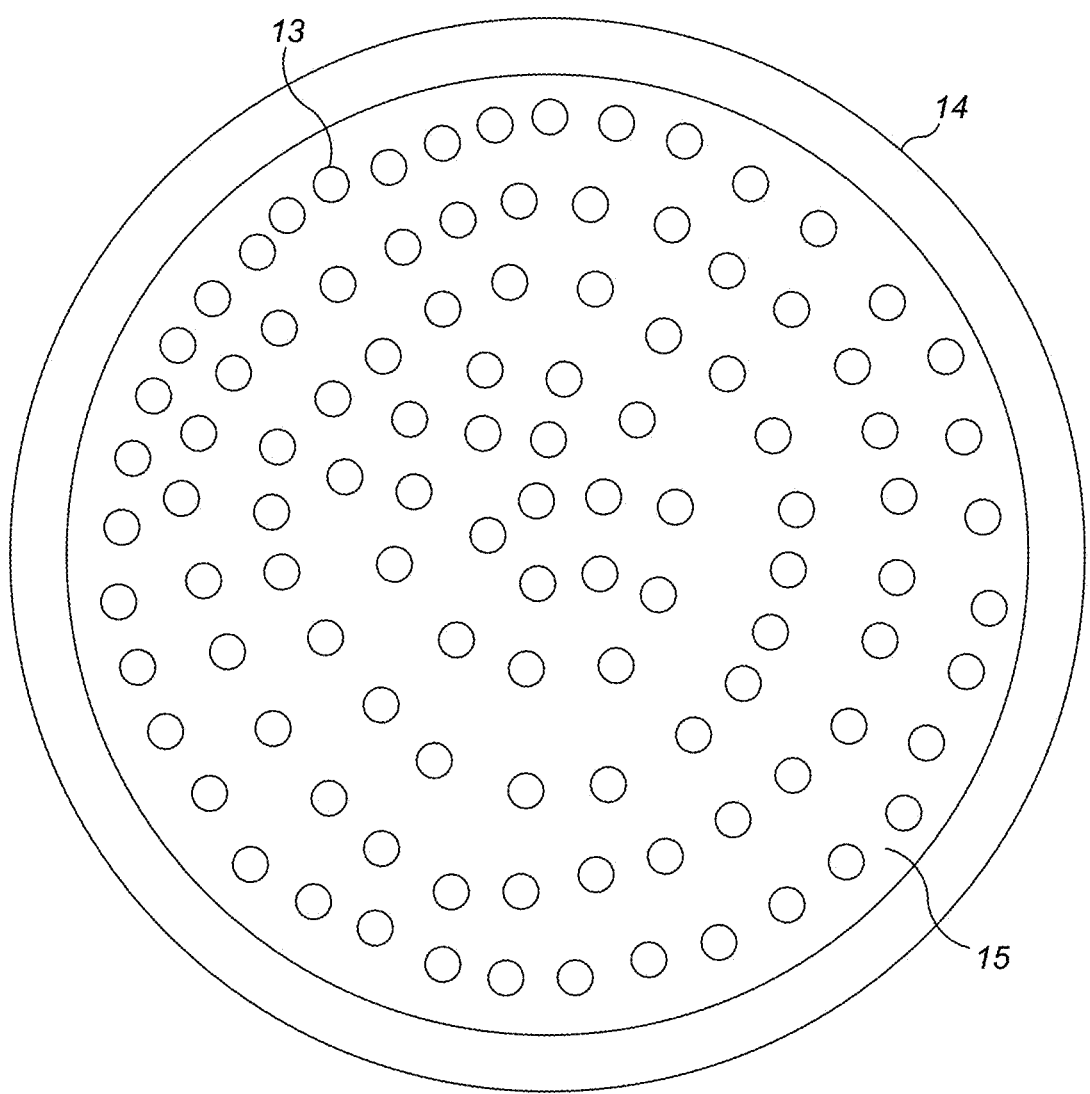
FIG. 5 depicts ends of hollow fibers from which filtered liquid comes out (13), potting module wall (14), and the sealant between the fiber ends (15).

The membrane of the present invention is formed from a number of hollow fibers, each having an inner surface and an outer surface, and comprises a network structure which integrally continues from one surface (e.g., the inner surface) to another surface (e.g., the outer surface) as shown in FIG. 3. The network structure in the membrane has no vacant portions of the polymer such as a finger-shaped structure layer having cavities and a void layer.

The membrane of the present invention comprises a network structure having an anisotropy in pore diameter, such that the membrane has a layer with a lower average pore diameter of pores present therein (hereinafter referred to as "average pore diameter of the outer surface") in the outer surface or near the outer surface compared to the average pore diameter of pores present in the inner surface of the membrane (hereinafter referred to as "average pore diameter of inner surface"). The pore diameter generally becomes gradually greater toward the inner surface of the membrane form that towards the outer surface of the membrane. According to an embodiment of the invention, it is ensured that more than 99% of the pores are of the size of mentioned diameter on the outer surface (hereinafter referred to as "average pore diameter of outer surface").

The membrane of the present invention has a void content of 70-90% when the material of the membrane is polyethersulfone and depending on the void content, the breaking stress IS in the range of 2 to 3.5-bar and the breaking elongation is up to 70%.

As materials which constitute the hollow fiber membrane of the present invention, mention may be made of, for example, polysulfone polymers, polyethersulfone, polyvinylidene fluoride polymers, polyacrylonitrile polymers, polymethacrylic acid polymers, polyamide polymers, polyimide polymers, polyetherimide polymers, and cellulose acetate polymers. Especially preferred are aromatic polysulfones, polyacrylonitrile copolymers, polyvinylidene fluoride, and aromatic polyetherimides. A type polyethersulfone is especially preferred.

In a further aspect of the present invention, there is also described a filtering device for liquid filtration comprising a hollow fiber membrane of the invention wherein the membrane is placed in a housing with at least one feed channel and at least one drain channel. According to the device of the invention, the hydrophilic layer of membrane maintains a capillary action of the liquid through the holes on the fiber walls towards the hollow cavity of fibers and decreases the requirement of suction pressure or passage pressure or gravitational head.

The intrinsically anti-microbial hollow fiber membrane is produced by spinning the polymer mixture at high speed revolutions to place the said polymer mixture at the circumference of the base polymers, wherein the polymer mixture comprising of 3% of antimicrobial embedded polyethersulfon 6020p in base polyethersulfon that does not include an antimicrobial substance which gives around 99.9% surface area of the finished product as antimicrobial. As the antimicrobial embedded polymer has higher density, the centrifugal force pushes it out-wards and places it at the circumference of the base polymer which reduces the cost of production of a product. The antimicrobial polymer is chemically developed by embedding the metal oxide particles in polymers through cross-linking between the polymeric chains. This produces an intrinsically antimicrobial polymer where the susbtances imparting antimicrobial properties never leach out and never migrate from the polymer to any other substance in contact.

Examples of the present invention will be shown below, but the present invention is not limited to these examples. Methods for the measurement of properties are as follows:

The hollow fiber membranes used as samples for measurement are all in the state of being sufficiently impregnated with water. As for the membrane obtained by using polyvinyl pyrrolidone as an additive, the membrane was dipped in an aqueous sodium hypochlorite solution and then washed with hot water to make a membrane in which substantially no polyvinyl pyrrolidone was present.

Water permeation of the hollow fiber membrane was expressed by the amount of filtered water when ultrafiltration water of 25.degree. C. was allowed to permeate through a sample of the hollow fiber.

Example 1

Although preferred embodiments of the present invention have been described for illustrative purposes, it will be apparent to those skilled in the art that various modifications, additions and substitutions can be made in the present invention without departing from the spirit or scope of the invention. Thus, it is intended that the present invention cover the modifications and variations of this invention provided they come within the scope of the appended claims and their equivalents.

The device of the present invention is an intrinsic anti-microbial hollow fiber membrane. The membrane received an intrinsic change on a micrometrical scale which results in antiseptic and antibacterial characteristics. The adhesion and proliferation of bacteria on the surface of the object are slowed down and the microbes and bacteria count is being strongly reduced. This antiseptic/anti-microbial nature of the material is the intrinsic property of the membrane polymer and never migrates/leaches with filtered liquid and never diminishes with use/time.

The hollow fiber consists of two layers. The outer layer is hydrophobic and the inner layer is hydrophilic by nature. The hydrophobic layer never allows the water to come in physical contact with membrane hence stops any adherence of any kind on it. Hydrophobic layer makes the air trappings minimum as the outside-in passage of air is facilitated by the absence of water layer on the outside hence decreasing the suction pressure requirement and increasing the flux of liquid. While the inner hydrophilic layer maintains a capillary action of the liquid through the holes on fiber walls towards the hollow cavity of fibers hence decreasing the requirement of suction pressure or passage pressure or gravitational head. The liquid flows in outside-in orientation i.e. filtration happens when liquid from the outside of the fiber wall passes through its hole and filtered liquid comes out of the hollow ending of the fiber. Hence keeping the unfiltered liquid outside the fiber walls and retaining the filtered liquid inside the hollow fiber. Making it the only membrane used with outside-in direction of flow while having a hydrophobic layer on its outside and a hydrophilic layer on its inside.

Fibers can have pores ranging from 0.1 nm to 25 nm in its walls. The liquid especially water is filtered when it passes to the hollow cavity of fiber from the holes in its walls from the outside of the fiber. The fibers make U-shaped membrane modules with open ends sealed and supported in such a way that U-shaped side always faces the liquid coming for filtration and filtered liquid always comes out through the open ends of fibers. The porosity of the fibers ranges from 70% to 90%.

The anti-microbial embedded polymer is developed by chemically bonding metal oxide particles in polymer ultrason Polyethersulfon (A BASF brand), which produces an intrinsically antimicrobial polymer in which the antimicrobicity never leaches out and never migrates from the polymer to any other substance come in contact with the surface of the polymer unlike the existing antimicrobial membranes on which antimicrobicity has been created by coating the surface with an antimicrobial substance which may leaches out and contaminate the substance which comes into contact with it. Polyethersulfon is the polymer of which the hollow fibers of the membrane are made.

The porosity is achieved during the hollow fiber membrane manufacturing process. The process involves the use of 2 tanks connected to the spinneret via gear-pump assisted flow tubes. The dope solution tank and the bore solution tank. The polymers are mixed with a solvent where they totally dissolve in the dope solution tank. As soon as the flow of both dope and bore solution (also called as the non-solvent) starts through the spinneret of the spinning machine the process of phase inversion starts (the polymer that was dissolved in the solvent now will start to solidify). This phenomenon can be explained by the simple process of mass-transfer, as soon as the non-solvent and solvent come in contact the interaction between them acts as the driving force to push the dissolved base polymer out of the solvent and hence it starts to solidify again. During this process the pores are created because the instantaneous (very short, takes less than a second) de-mixing the time period too short for the polymer to solidify completely and hence as the polymer starts to come out of the solvent and solidify, the instantaneous nature of de-mixing renders some discontinuities in the solidifying polymeric structure and these discontinuities (spaces) are ultimately the pores and all these pores combined to give the porosity to the fiber. The process of fiber formation is carried out at 50 degrees Celsius at atmospheric pressure with the spinneret operating at 500 rpm. 3% by weight of the total polymer is formed from the antimicrobial embedded polymer, whilst 97% is antimicrobial substance absent polymer.

Example 2:—Pore Formation

A dope solution/polymer solution was made by combining the components in the table below. To this, the below described bore solution/inner solution was added and the combination thoroughly mixed. This mixture was then passed through a spinneret along with water in order to form hollow fibers.

1. In the process of making dope solution, low molecular weight additives (such as LiCl etc) should be added first in the solvent with constant agitation and at 50° C.
2. Gradually, additives with the higher molar masses (such as PEG, PVP etc) should be introduced into the solvent at constant stirring.
3. Lastly, the base polymer (such as PES, PSU etc.) will be introduced in the dope solution under the constant stirring and at 80° C. for approx. three hours.
4. Dope solution will only be considered ready for spinning, until all the additives and the base polymer is homogenously dissolved in the solvent. The dope solution should be in one phase before spinning along with the absence of any air bubbles and foreign particles.
5. Dope solution should be left overnight or for sufficient amount of time, without agitation, in order to remove the air bubbles, generate during stirring.
6. The spinneret temperature should be at room temperature but the temperature of the coagulant liquid should be at 50° C.
7. The bore liquid can be either pure PEG or a mixture of PEG:Water 9:1 or NMP:Water 9:1.

| Dope Solution/Polymer Solution (% by volume) | Bore Solution/ Inner Solution | Coagulant |
|---|---|---|
| PES 15% Polyethersulone (Ultrason ® E6020P) PEG 38% (Polyethylene glycol) LiCl (Lithium Chloride) 1.5% H2O 2% NMP (N-methyl-2-Pyrrolidone) 43.5% | PEG:Water (9:1) | 100% Water |

It has been found that fibers produced according to the above process, through testing and benchmarking the performance of these fibers, are superior as compared to the fibers available currently at disposal or cited in the prior arts. The PWP and CWF values are higher then what usually are reported for such fibers in the published literature. PWP value of 1800 Lmh and CWF value of 900 Lmh for fibers with 20 nm pore size is higher than those compared to the Hollow fiber membranes for ultra-filtration.

Figure 6:
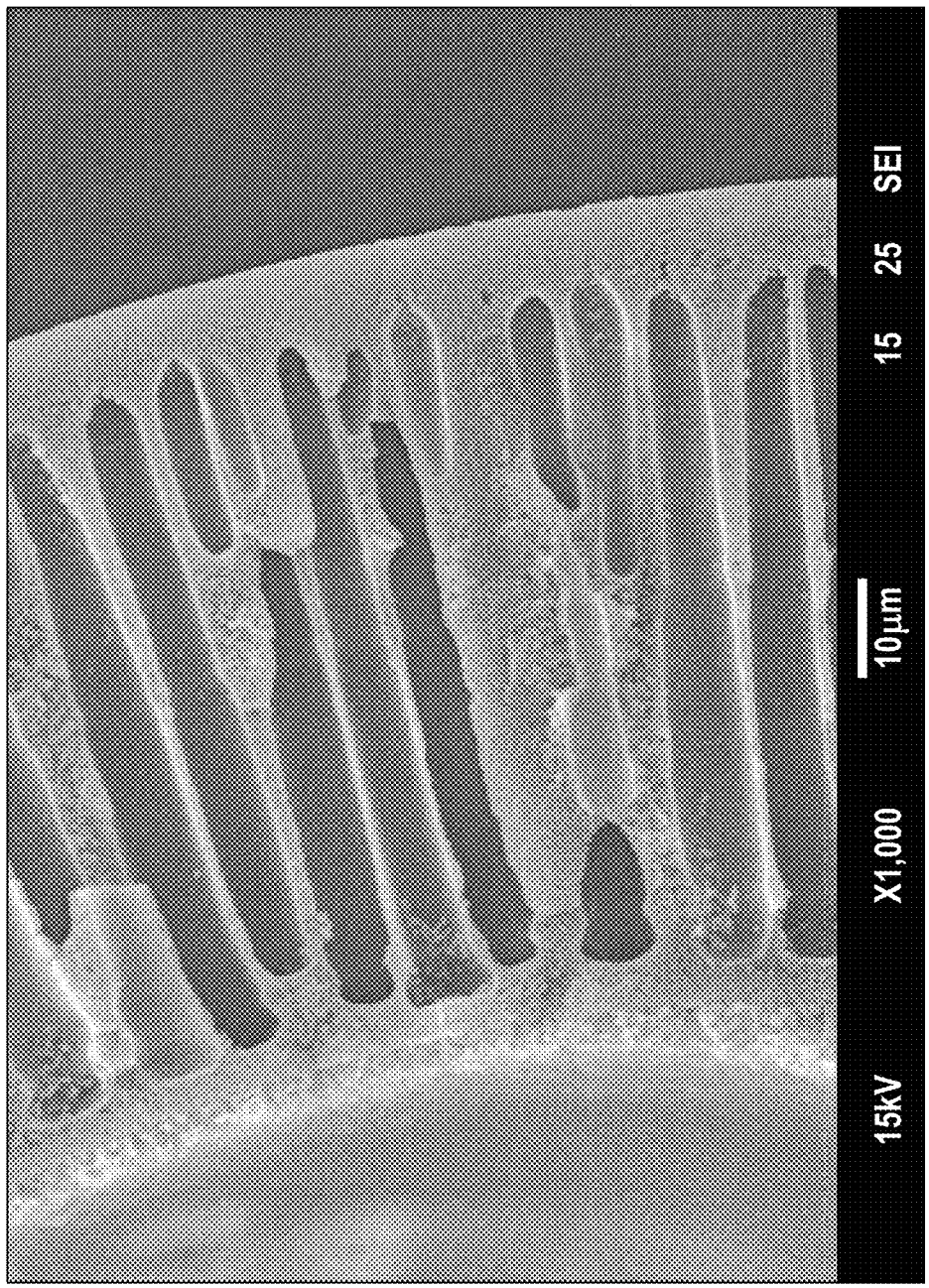
FIG. 6 depicts a SEM Picture of the fiber wall thickness close-up.
Figure 7:
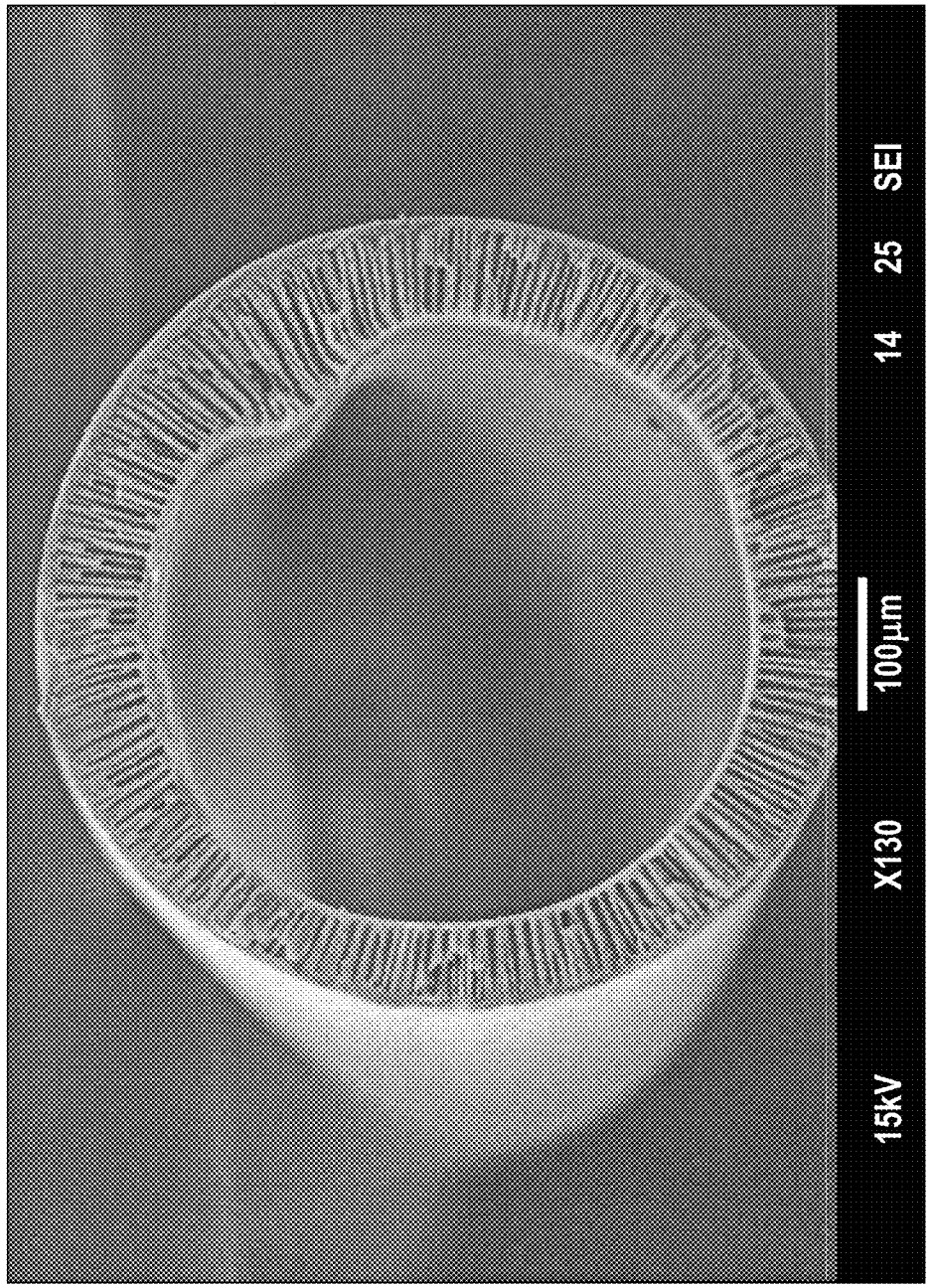
FIG. 7 depicts a SEM Picture of the fiber wall thickness in whole cross section.

When PEG is used as the bore solution and as a pore former in the dope, it is believed due to its high viscosity and flowing behavior, it has been observed to impart properties to the nascent fibers in terms of morphology. In particular, the fibers tend to have a well pronounced finger-like pore structures, hence having straight and well-pronounced channels along the thickness of the fiber as seen in the FIG. 6 and FIG. 7, the picture of the wall thickness taken with a Scanning Electron Microscope (SEM) when the fiber is observed with the instrument with its cross-section facing the observer.

The Pure Water Permeation and Critical Water Flux for the fibers made according to the above method were then established.

Pure Water Permeability (PWP): The pure water permeability, also known as the pure water flux is defined as the volume of water that passes through a membrane per unit time, per unit area and pre-unit of transmembrane pressure. This property indicates the effort required to generate permeate for a membrane and can be used to compare the initial performance of a membrane. This analysis does not, however, provide any guidance as to the performance of the material for extended periods of time and so it is also useful to look at Critical Water Flux. (see Persson, Kenneth M., Vassilis Gekas, and Gun Trägårdh. "Study of membrane compaction and its influence on ultrafiltration water permeability." Journal of membrane science 100, no. 2 (1995): 155-162.)

Critical Water Flux (CWF): Either as the flux at which the transmembrane pressure (TMP) starts to deviate from the pure water line (the strong form of critical flux) or as the first permeate flux for which irreversible fouling appears on the membrane surface. The critical flux can be generally defined as the "first" permeate flux for which fouling becomes predominant; being then well differentiated from limiting flux (the "last" flux reachable). (see Bacchin, Patrice, Pierre Aimar, and Robert W. Field. "Critical and sustainable fluxes: theory, experiments, and applications." Journal of membrane science 281, no. 1-2 (2006): 42-69).

10 separate samples of the fibers made according to the above methodology were created and used to form 10 separate membranes. The membranes were tested to establish their PWP and CWF. The membranes formed were tested for their PWP and CWF by:

Pure water flux experiments were performed using deionized water. Each module was immersed in deionized water for 24 h, and run in the test system for 1½ h, to eliminate the effect of the residual glycerol on the hollow-fiber membranes before any sample collection. A UF experimental unit designed to evaluate the PWP and protein rejection is shown in detail (Please see: C. S. Feng, B. Shi, G. Li, Y. Wu, Preparation and properties of microporous membrane from polyvinylidene fluoride cotetrafluoroethylene) (F2.4) for membrane distillation, J. Membr. Sci. 237 (2004) 15-24.). A transmembrane pressure of 1 bar and feed solution temperature of 20° C., all experiments were performed in hollow-fiber modules with crossflow mode. Two modules were prepared for each hollow-fiber sample.

Pure water permeation fluxes (PWP) were obtained as follows:

When the pure water is passed through the membrane and readings calculated using the equation above each value is tabulated and a graph between time and the readings is plotted. For the prolonged or extended period of time (in our case more than 5 hours) the PWP value begins to stabilize signifying the CWF value for the membrane at this point. The apparatus used for carrying out the PWP tests on the fibers can be represented by the following schematic:

The results and essential conditions for the test are provided in Table 1 below. The test was carried out at STP.

The table enlists the data recorded during for the PWP test performed on the 10 hollow fiber membrane samples prepared.

TABLE 1

Flux Tables-5 pairs from 10 samples

HF membrane 1 flux summary

PakVitae's lab In Singapore

| | | | | | |
|---|---|---|---|---|---|
| Unit No | 1 | 1 | 1 | 1 | 1 |
| Date | 5 Mar. 2019 | | | | |
| Inlet Pressure (bar) | 1 | 1 | 1 | 1 | 1 |
| Fiber ID | Fiber-1 | | | | |
| Flow Pattern | OUT TO IN | OUT TO IN | OUT TO IN | OUT TO IN | OUT TO IN |
| Number of Fibers | 14 | 14 | 14 | 14 | 14 |
| Length of Fibers (mm) | 180 | 180 | 180 | 180 | 180 |
| ID (Reading under NUS x5 NUS Lab) | 15 | 15 | 15 | 15 | 15 |
| OD (Reading under NUS x5, NUS Lab) | 25 | 25 | 25 | 25 | 25 |
| ID (mm) | 0.300 | 0.300 | 0.300 | 0.300 | 0.300 |
| OD (mm) | 0.500 | 0.500 | 0.500 | 0.500 | 0.500 |
| Area of fibers (m2) | 0.00396 | 0.00396 | 0.00396 | 0.00396 | 0.00396 |
| Total Duration Time (mins) | 0 | 30 | 60 | 90 | 120 |
| PUB water permeability (g/min) g/m | 785 | 507 | 355 | 303 | 270 |
| Times mins | 5 | 5 | 5 | 5 | 5 |
| PUB Water Flux (LMH-Bar) LMH | 2380 | 1540 | 1080 | 920 | 820 |
| Average Water Flux (LMH-Bar) | 1350 | | | | |

HF membrane 2 flux summary

| | | | | | |
|---|---|---|---|---|---|
| Unit No | 1 | 1 | 1 | 1 | 1 |
| Date | 5 Mar. 2019 | | | | |
| Inlet Pressure (bar) | 1 | 1 | 1 | 1 | 1 |
| Fiber ID | Fiber-2 | | | | |
| Flow Pattern | OUT TO IN | OUT TO IN | OUT TO IN | OUT TO IN | OUT TO IN |
| Number of Fibers | 14 | 14 | 14 | 14 | 14 |
| Length of Fibers (mm) | 180 | 180 | 180 | 180 | 180 |
| ID (Reading under NUS x5 NUS Lab) | 15 | 15 | 15 | 15 | 15 |
| OD (Reading under NUS x5, NUS Lab) | 25 | 25 | 25 | 25 | 25 |
| ID (mm) | 0.300 | 0.300 | 0.300 | 0.300 | 0.300 |
| OD (mm) | 0.500 | 0.500 | 0.500 | 0.500 | 0.500 |
| Area of fibers (m2) | 0.00396 | 0.00396 | 0.00396 | 0.00396 | 0.00396 |
| Total Duration Time (mins) | 0 | 60 | 90 | 120 | |
| PUB water permeability (g/min) g/m | 589 | 406 | 352 | 308 | |
| Times mins | 5 | 5 | 5 | 5 | |
| PUB Water Flux (LMH-Bar) LMH | 1790 | 1230 | 1070 | 930 | |
| Average Water Flux (LMH-Bar) | 1260 | | | | |

HF membrane 3 flux summary

PakVitae's lab In Singapore

| | | | | | |
|---|---|---|---|---|---|
| Unit No | 1 | 1 | 1 | 1 | 1 |
| Date | 10 Mar. 2019 | | | | |
| Inlet Pressure (bar) | 1 | 1 | 1 | 1 | 1 |
| Fiber ID | Fiber-3 | | | | |
| Flow Pattern | OUT TO IN | OUT TO IN | OUT TO IN | OUT TO IN | OUT TO IN |
| Number of Fibers | 14 | 14 | 14 | 14 | 14 |
| Length of Fibers (mm) | 180 | 180 | 180 | 180 | 180 |
| ID (Reading under NUS x5 NUS Lab) | 15 | 15 | 15 | 15 | 15 |
| OD (Reading under NUS x5, NUS Lab) | 25 | 25 | 25 | 25 | 25 |
| ID (mm) | 0.300 | 0.300 | 0.300 | 0.300 | 0.300 |
| OD (mm) | 0.500 | 0.500 | 0.500 | 0.500 | 0.500 |
| Area of fibers (m2) | 0.00396 | 0.00396 | 0.00396 | 0.00396 | 0.00396 |
| Total Duration Time (mins) | 0 | 30 | 60 | 90 | 120 |
| PUB water permeability (g/min) g/m | 596 | 522 | 466 | 392 | 295 |
| Times mins | 5 | 5 | 5 | 5 | 5 |
| PUB Water Flux (LMH-Bar) LMH | 1810 | 1585 | 1415 | 1190 | 895 |
| Average Water Flux (LMH-Bar) | 1415 | | | | |

HF membrane 4 flux summary

| | | | | | |
|---|---|---|---|---|---|
| Unit No | 1 | 1 | 1 | 1 | 1 |
| Date | 10 Mar. 2019 | | | | |
| Inlet Pressure (bar) | 1 | 1 | 1 | 1 | 1 |
| Fiber ID | Fiber-4 | | | | |
| Flow Pattern | OUT TO IN | OUT TO IN | OUT TO IN | OUT TO IN | OUT TO IN |
| Number of Fibers | 14 | 14 | 14 | 14 | 14 |
| Length of Fibers (mm) | 180 | 180 | 180 | 180 | 180 |
| ID (Reading under NUS x5 NUS Lab) | 15 | 15 | 15 | 15 | 15 |
| OD (Reading under NUS x5, NUS Lab) | 25 | 25 | 25 | 25 | 25 |
| ID (mm) | 0.300 | 0.300 | 0.300 | 0.300 | 0.300 |
| OD (mm) | 0.500 | 0.500 | 0.500 | 0.500 | 0.500 |
| Area of fibers (m2) | 0.00396 | 0.00396 | 0.00396 | 0.00396 | 0.00396 |
| Total Duration Time (mins) | 30 | 60 | 90 | 120 | |
| PUB water permeability (g/min) g/m | 443 | 374 | 286 | | |
| Times mins | 5 | 5 | 5 | | |
| PUB Water Flux (LMH-Bar) LMH | 1345 | 1135 | 870 | | |
| Average Water Flux (LMH-Bar) | 1350 | | | | |

HF membrane 5 flux summary

PakVitae's lab In Singapore

| | | | | | |
|---|---|---|---|---|---|
| Unit No | 1 | 1 | 1 | 1 | 1 |
| Date | 15 Mar. 2019 | | | | |
| Inlet Pressure (bar) | 1 | 1 | 1 | 1 | 1 |
| Fiber ID | Fiber-5 | | | | |
| Flow Pattern | OUT TO IN | OUT TO IN | OUT TO IN | OUT TO IN | OUT TO IN |
| Number of Fibers | 14 | 14 | 14 | 14 | 14 |
| Length of Fibers (mm) | 180 | 180 | 180 | 180 | 180 |
| ID (Reading under NUS x5 NUS Lab) | 15 | 15 | 15 | 15 | 15 |
| OD (Reading under NUS x5, NUS Lab) | 25 | 25 | 25 | 25 | 25 |
| ID (mm) | 0.300 | 0.300 | 0.300 | 0.300 | 0.300 |
| OD (mm) | 0.500 | 0.500 | 0.500 | 0.500 | 0.500 |
| Area of fibers (m2) | 0.00396 | 0.00396 | 0.00396 | 0.00396 | 0.00396 |
| Total Duration Time (mins) | 0 | 30 | 60 | 90 | 120 |
| PUB water permeability (g/min) g/m | 630 | 545 | 466 | 392 | 295 |
| Times mins | 5 | 5 | 5 | 5 | 5 |
| PUB Water Flux (LMH-Bar) LMH | 1910 | 1655 | 1415 | 1190 | 895 |
| Average Water Flux (LMH-Bar) | 1415 | | | | |

HF membrane 6 flux summary

| | |
|---|---|
| Unit No | 1 |
| Date | 15 Mar. 2019 |
| Inlet Pressure (bar) | 1 |
| Fiber ID | Fiber-6 |
| Flow Pattern | OUT TO IN |
| Number of Fibers | 14 |
| Length of Fibers (mm) | 180 |

TABLE 1-continued

Flux Tables-5 pairs from 10 samples

| | | | | | |
|---|---|---|---|---|---|
| ID (Reading under NUS x5 NUS Lab) | 15 | 15 | 15 | 15 | 15 |
| OD (Reading under NUS x5, NUS Lab) | 25 | 25 | 25 | 25 | 25 |
| ID (mm) | 0.300 | 0.300 | 0.300 | 0.300 | 0.300 |
| OD (mm) | 0.500 | 0.500 | 0.500 | 0.500 | 0.500 |
| Area of fibers (m2) | 0.00396 | 0.00396 | 0.00396 | 0.00396 | 0.00396 |
| Total Duration Time (mins) | 0 | 30 | 60 | 90 | 120 |
| PUB water permeability (g/min) g/m | 730 | 645 | 524 | 409 | 240 |
| Times mins | 5 | 5 | 5 | 5 | 5 |
| PUB Water Flux (LMH-Bar) LMH | 2215 | 1955 | 1590 | 1240 | 730 |
| Average Water Flux (LMH-Bar) | | | 1550 | | |

HF membrane 7 flux summary

| | | | | | |
|---|---|---|---|---|---|
| PakVitae's lab In Singapore | | | | | |
| Unit No | 1 | 1 | 1 | 1 | 1 |
| Date | 20 Mar. 2019 | | | | |
| Inlet Pressure (bar) | 1 | 1 | 1 | 1 | 1 |
| Fiber ID | Fiber-7 | | | | |
| Flow Pattern | OUT TO IN | OUT TO IN | OUT TO IN | OUT TO IN | OUT TO IN |
| Number of Fibers | 14 | 14 | 14 | 14 | 14 |
| Length of Fibers (mm) | 180 | 180 | 180 | 180 | 180 |
| ID (Reading under NUS x5 NUS Lab) | 15 | 15 | 15 | 15 | 15 |
| OD (Reading under NUS x5, NUS Lab) | 25 | 25 | 25 | 25 | 25 |
| ID (mm) | 0.300 | 0.300 | 0.300 | 0.300 | 0.300 |
| OD (mm) | 0.500 | 0.500 | 0.500 | 0.500 | 0.500 |
| Area of fibers (m2) | 0.00396 | 0.00396 | 0.00396 | 0.00396 | 0.00396 |
| Total Duration Time (mins) | 0 | 30 | 60 | 90 | 120 |
| PUB water permeability (g/min) g/m | 707 | 556 | 416 | 326 | 251 |
| Times mins | 5 | 5 | 5 | 5 | 5 |
| PUB Water Flux (LMH-Bar) LMH | 2140 | 1690 | 1260 | 990 | 760 |
| Average Water Flux (LMH-Bar) | | | 1370 | | |

HF membrane 8 flux summary

| | | | | | |
|---|---|---|---|---|---|
| Unit No | 1 | 1 | 1 | 1 | 1 |
| Date | 20 Mar. 2019 | | | | |
| Inlet Pressure (bar) | 1 | 1 | 1 | 1 | 1 |
| Fiber ID | Fiber-8 | | | | |
| Flow Pattern | OUT TO IN | OUT TO IN | OUT TO IN | OUT TO IN | OUT TO IN |
| Number of Fibers | 14 | 14 | 14 | 14 | 14 |
| Length of Fibers (mm) | 180 | 180 | 180 | 180 | 180 |
| ID (Reading under NUS x5 NUS Lab) | 15 | 15 | 15 | 15 | 15 |
| OD (Reading under NUS x5, NUS Lab) | 25 | 25 | 25 | 25 | 25 |
| ID (mm) | 0.300 | 0.300 | 0.300 | 0.300 | 0.300 |
| OD (mm) | 0.500 | 0.500 | 0.500 | 0.500 | 0.500 |
| Area of fibers (m2) | 0.00396 | 0.00396 | 0.00396 | 0.00396 | 0.00396 |
| Total Duration Time (mins) | 0 | 30 | 60 | 90 | 120 |
| PUB water permeability (g/min) g/m | 674 | 515 | 416 | 305 | 292 |
| Times mins | 5 | 5 | 5 | 5 | 5 |
| PUB Water Flux (LMH-Bar) LMH | 2040 | 1560 | 1260 | 920 | 890 |
| Average Water Flux (LMH-Bar) | | | 1360 | | |

HF membrane 9 flux summary

| | | | | | |
|---|---|---|---|---|---|
| PakVitae's lab In Singapore | | | | | |
| Unit No | 1 | 1 | 1 | 1 | 1 |
| Date | 25 Mar. 2019 | | | | |
| Inlet Pressure (bar) | 1 | 1 | 1 | 1 | 1 |
| Fiber ID | Fiber-9 | | | | |
| Flow Pattern | OUT TO IN | OUT TO IN | OUT TO IN | OUT TO IN | OUT TO IN |
| Number of Fibers | 14 | 14 | 14 | 14 | 14 |
| Length of Fibers (mm) | 180 | 180 | 180 | 180 | 180 |
| ID (Reading under NUS x5 NUS Lab) | 15 | 15 | 15 | 15 | 15 |
| OD (Reading under NUS x5, NUS Lab) | 25 | 25 | 25 | 25 | 25 |
| ID (mm) | 0.300 | 0.300 | 0.300 | 0.300 | 0.300 |
| OD (mm) | 0.500 | 0.500 | 0.500 | 0.500 | 0.500 |
| Area of fibers (m2) | 0.00396 | 0.00396 | 0.00396 | 0.00396 | 0.00396 |
| Total Duration Time (mins) | 0 | 30 | 60 | 90 | 120 |
| PUB water permeability (g/min) g/m | 406 | 354 | 303 | 275 | — |
| Times mins | 5 | 5 | 5 | 5 | 5 |
| PUB Water Flux (LMH-Bar) LMH | 1230 | 1070 | 920 | 830 | — |
| Average Water Flux (LMH-Bar) | | | 1290 | | |

HF membrane 10 flux summary

| | | | | | |
|---|---|---|---|---|---|
| Unit No | 1 | 1 | 1 | 1 | 1 |
| Date | 25 Mar. 2019 | | | | |
| Inlet Pressure (bar) | 1 | 1 | 1 | 1 | 1 |
| Fiber ID | Fiber-10 | | | | |
| Flow Pattern | OUT TO IN | OUT TO IN | OUT TO IN | OUT TO IN | OUT TO IN |
| Number of Fibers | 14 | 14 | 14 | 14 | 14 |
| Length of Fibers (mm) | 180 | 180 | 180 | 180 | 180 |
| ID (Reading under NUS x5 NUS Lab) | 15 | 15 | 15 | 15 | 15 |
| OD (Reading under NUS x5, NUS Lab) | 25 | 25 | 25 | 25 | 25 |
| ID (mm) | 0.300 | 0.300 | 0.300 | 0.300 | 0.300 |
| OD (mm) | 0.500 | 0.500 | 0.500 | 0.500 | 0.500 |
| Area of fibers (m2) | 0.00396 | 0.00396 | 0.00396 | 0.00396 | 0.00396 |
| Total Duration Time (mins) | 0 | 30 | 60 | 90 | 120 |
| PUB water permeability (g/min) g/m | 515 | 364 | — | — | — |
| Times mins | 5 | 5 | 5 | 5 | 5 |
| PUB Water Flux (LMH-Bar) LMH | 1560 | 1100 | — | — | — |
| Average Water Flux (LMH-Bar) | | | 1300 | | |

Figure 8:
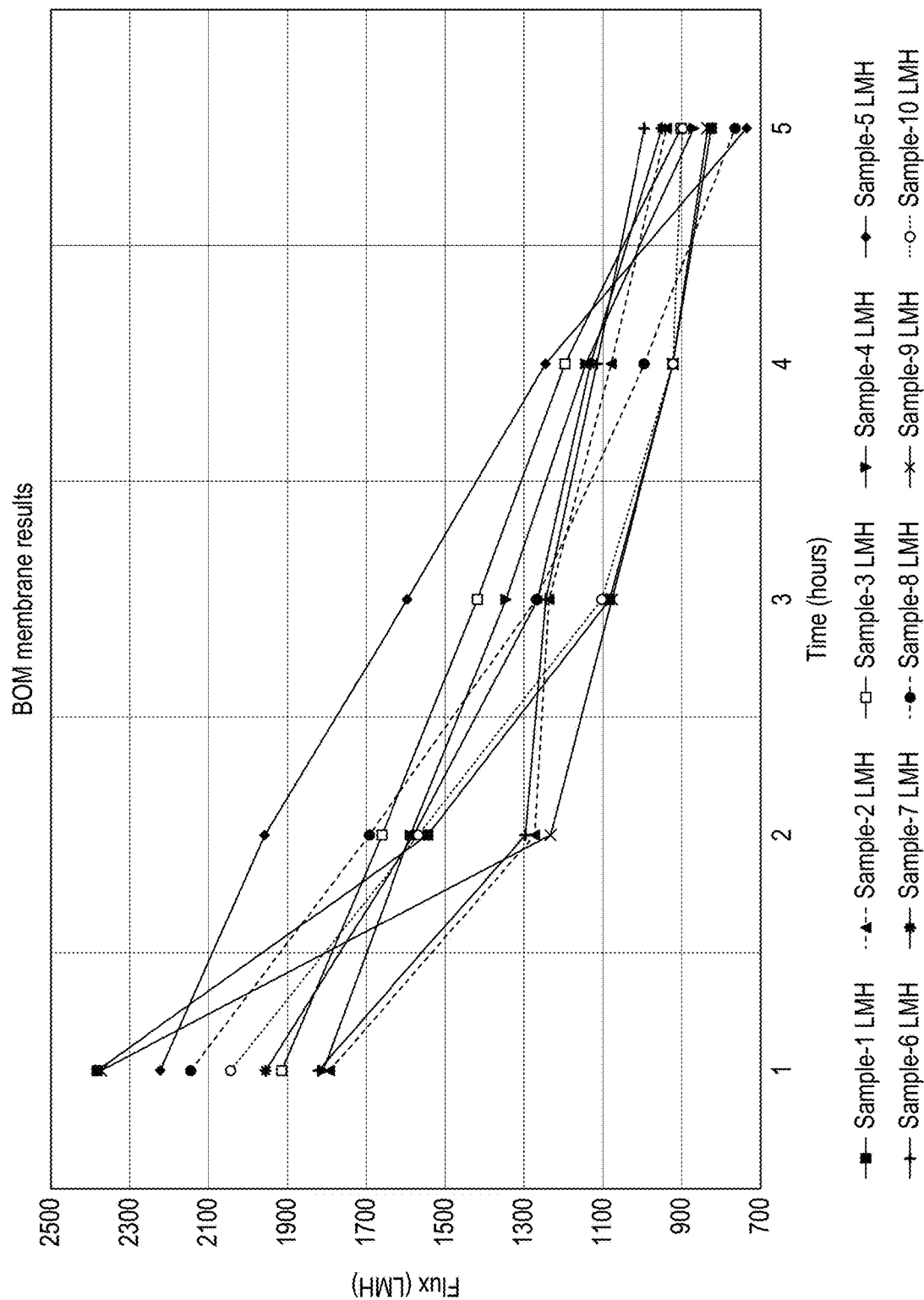
FIG. 8 depicts a chart of the water flux over time derived from a study of 10 membranes made according to the present invention

Table 2 provides a summary of the Pure Water Flux established over 5-minute intervals over a 120 minute period for each of the membranes. The results are also charted in FIG. 8

TABLE 2

| Sample-1 LMH | Sample-2 LMH | Sample-3 LMH | Sample-4 LMH | Sample-5 LMH | Sample-6 LMH | Sample-7 LMH | Sample-8 LMH | Sample-9 LMH | Sample-10 LMH |
|---|---|---|---|---|---|---|---|---|---|
| 2380 | 1790 | 1910 | 1810 | 2215 | 1815 | 1950 | 2140 | 2370 | 2040 |
| 1540 | 1270 | 1655 | 1585 | 1955 | 1290 | 1570 | 1690 | 1230 | 1560 |
| 1080 | 1230 | 1415 | 1345 | 1590 | 1240 | 1260 | 1260 | 1070 | 1100 |
| 920 | 1070 | 1190 | 1135 | 1240 | 1110 | 1130 | 990 | 920 | 920 |
| 820 | 930 | 895 | 870 | 730 | 985 | 945 | 760 | 830 | 890 |

Table 2 provides a summary of the Pure Water Flux established over 5-minute intervals over a 120 minute period for each of the membranes. The results are also charted in FIG. 8

From these results, it can be seen that there is a good level of consistency across each of the samples. It can also be concluded that the initial PWP readings are higher as compared to the conventional fibers, although over the prolonged testing the PWP readings tend to decline and stabilize at a point (where the graph tends to become straight and have a constant slope) which is designated as the CWF for the respective membrane and CWF is the parameters which is used as the design factor when such membranes are used in their practical applications. However it can be seen that for all the samples the CWF is in the range of 800 to 900 Lmh, which again is an advantageous property of the fibers describes in the present invention, as it will require less pressure to permeate the same amount of water through these fiber as compared to the conventional ones, hence saving costs.

Example 3: Testing for the Antimicrobial Nature of the Membrane Fiber Surface A membrane was provided with hollow fibers made according to Example 2, but with zinc salt embedded within the polymer. The principal polymer for fiber making, in our case polyethersulfuone is modified using the salts of Zinc such as Zinc Pyrithione and etc. The modification is done based on the methods described in the U.S. Pat. No. 9,527,918.

The membrane was then tested for its ability to inhibit two types of bacterial strains (*Escherichia coli* ATCC 8739 (Gram−) and *Staphylococcus aureus* 6538 (Gram+)) using the standard international method for evaluating the antibacterial of the polymer surfaces.

Figure 9:
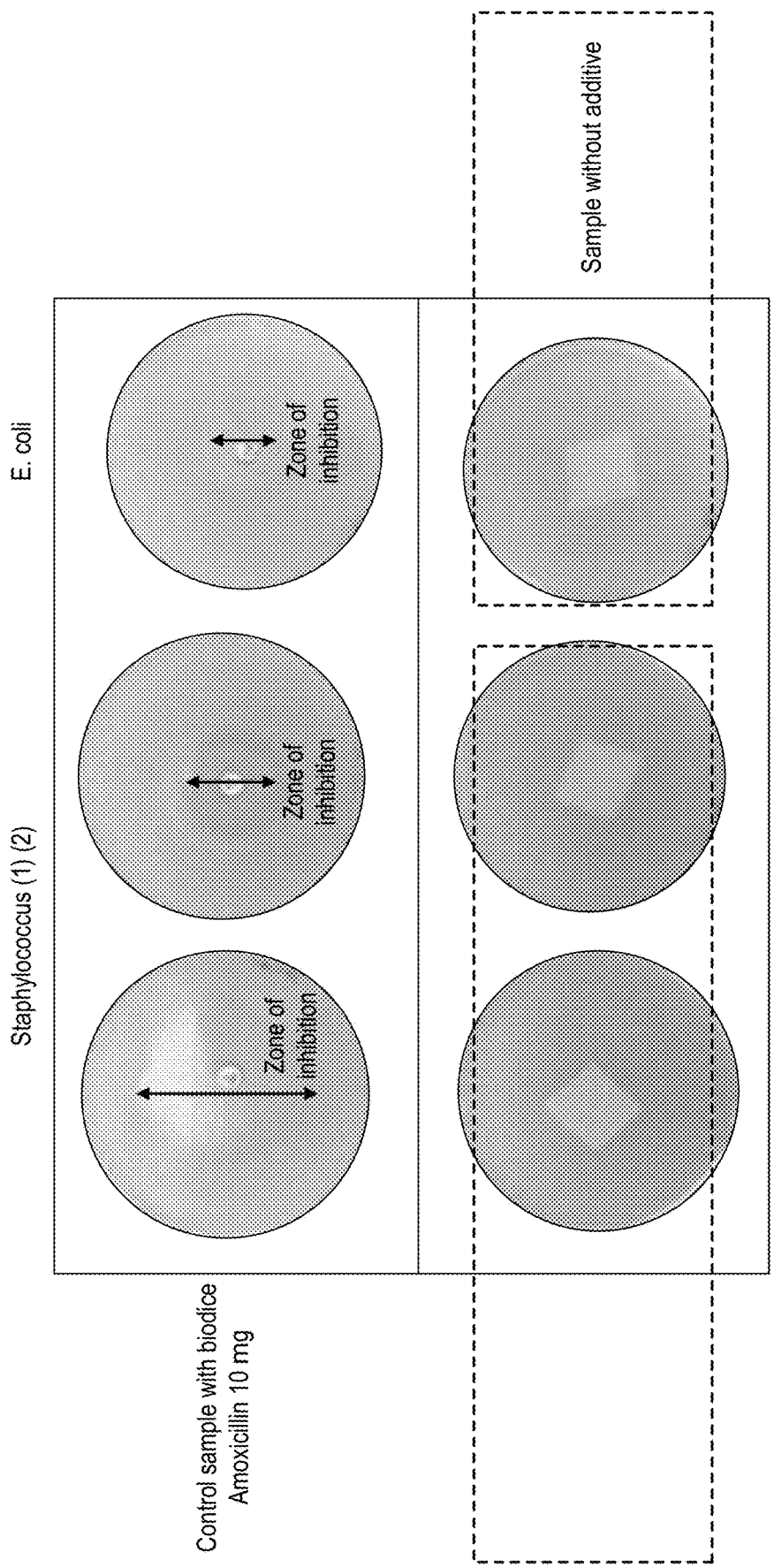
FIG. 9 depicts the results of an antibacterial study of the fiber material of the present invention.
Figure 10:
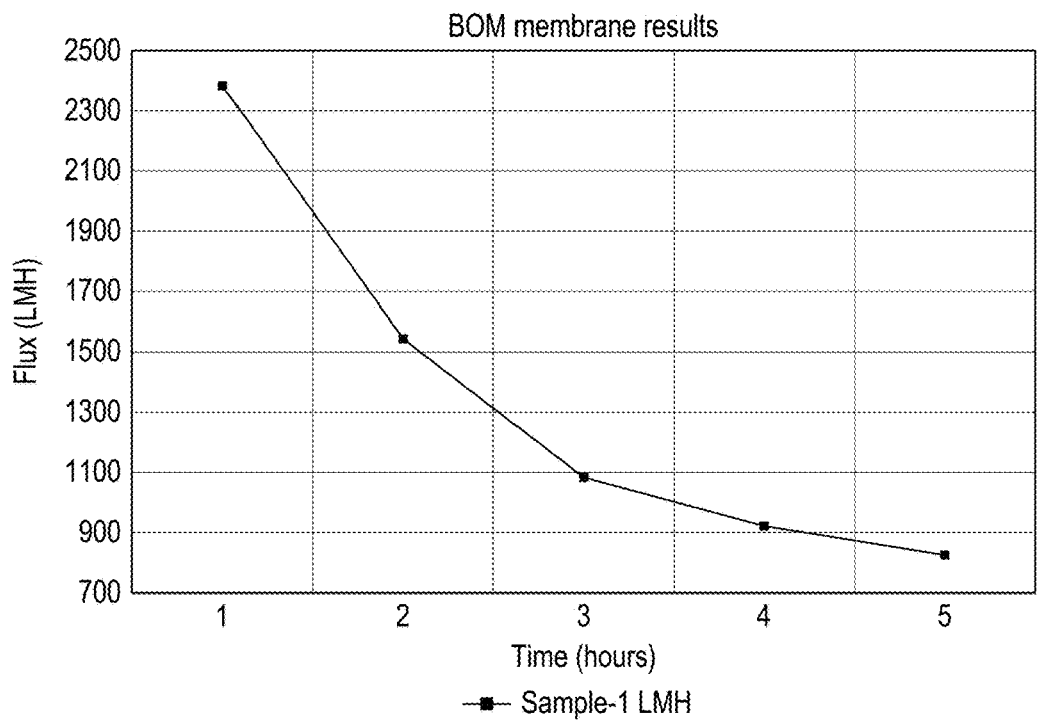
FIG. 10 depicts representation of the Flux behavior of the membrane sample-1 corresponding to the data in Table named under column HF Membrane Flux summary, the sample was tested for PWP and CWF, the graph is extracted from for Figure-8 for the purpose of clarity. The graph shows that the initial PWP reading was recorded at 2400 LMH and then normalizing at 800 LMH.
Figure 11:
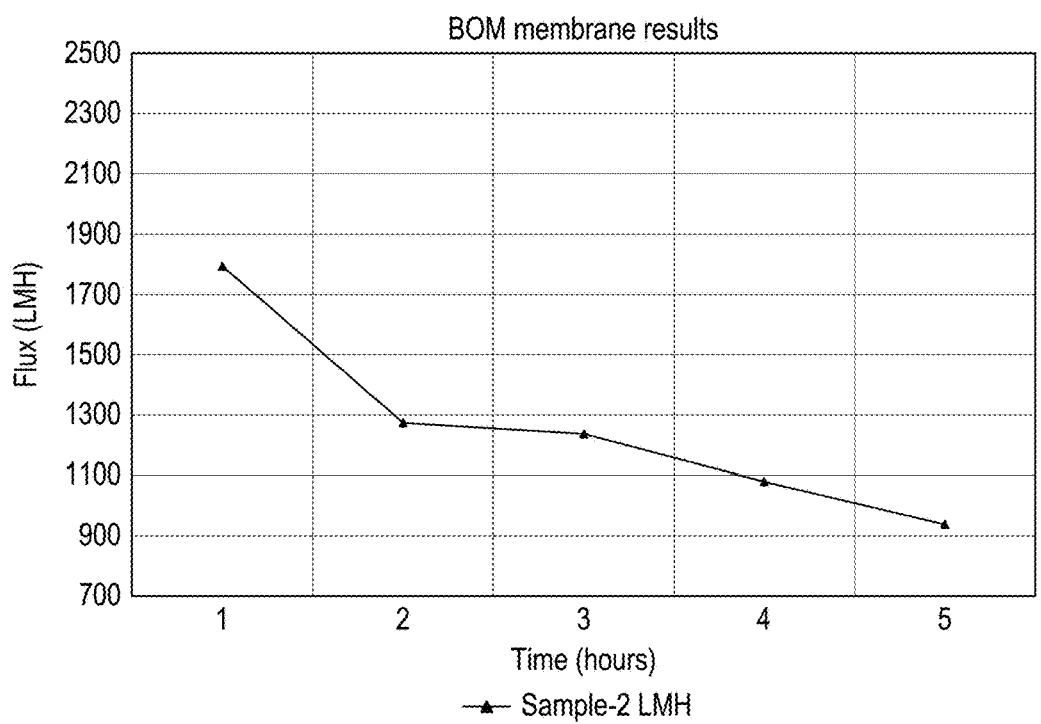
FIG. 11 depicts representation of the Flux behavior of the membrane sample-2 corresponding to the data in Table named under column HF Membrane-2 Flux summary, the sample was tested for PWP and CWF, the graph is extracted from for Figure-8 for the purpose of clarity. The graph shows that the initial PWP reading was recorded around 1800 LMH and then normalizing at a reading a little above 900 LMH.
Figure 12:
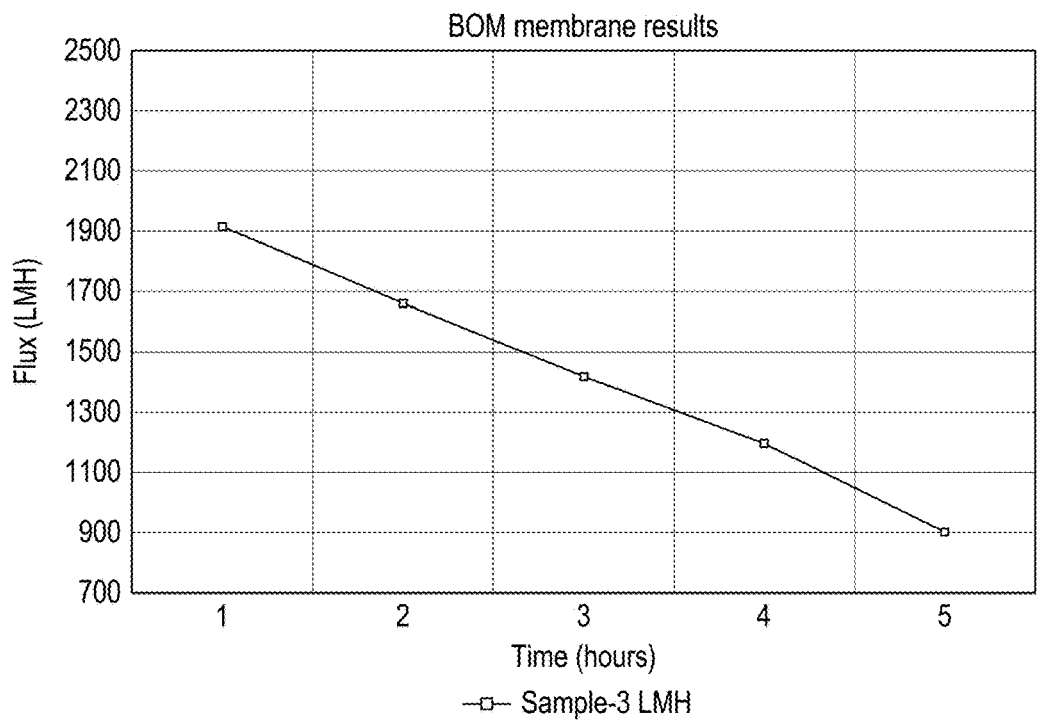
FIG. 12 depicts representation of the Flux behavior of the membrane sample-3 corresponding to the data in Table named under column HF Membrane-3 Flux summary, the sample was tested for PWP and CWF, the graph is extracted from for Figure-8 for the purpose of clarity. The graph shows that the initial PWP reading was recorded at 1900 LMH and then normalizing at 900 LMH.
Figure 13:
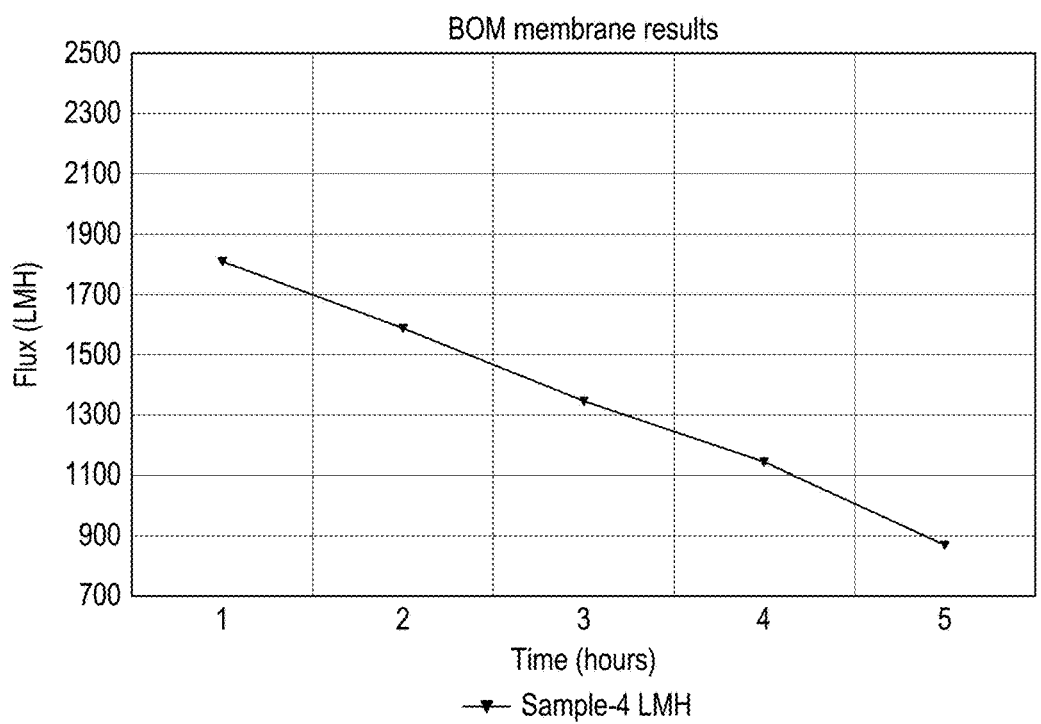
FIG. 13 depicts representation of the Flux behavior of the membrane sample-4 corresponding to the data in Table named under column HF Membrane-4 Flux summary, the sample was tested for PWP and CWF, the graph is extracted from for Figure-8 for the purpose of clarity. The graph shows that the initial PWP reading was recorded around 1800 LMH and then normalizing at a reading at around 880 LMH.
Figure 14:
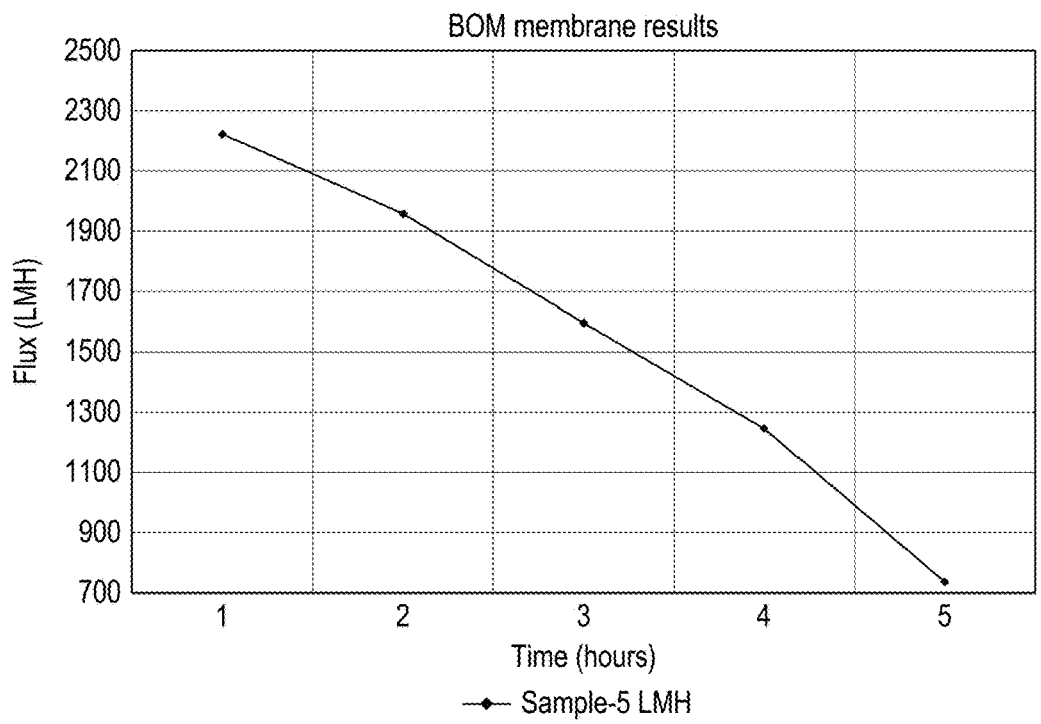
FIG. 14 depicts representation of the Flux behavior of the membrane sample-5 corresponding to the data in Table named under column HF Membrane-5 Flux summary, the sample was tested for PWP and CWF, the graph is extracted from for Figure-8 for the purpose of clarity. The graph shows that the initial PWP reading was recorded around 2200 LMH and then normalizing at a reading a little above 700 LMH.
Figure 15:
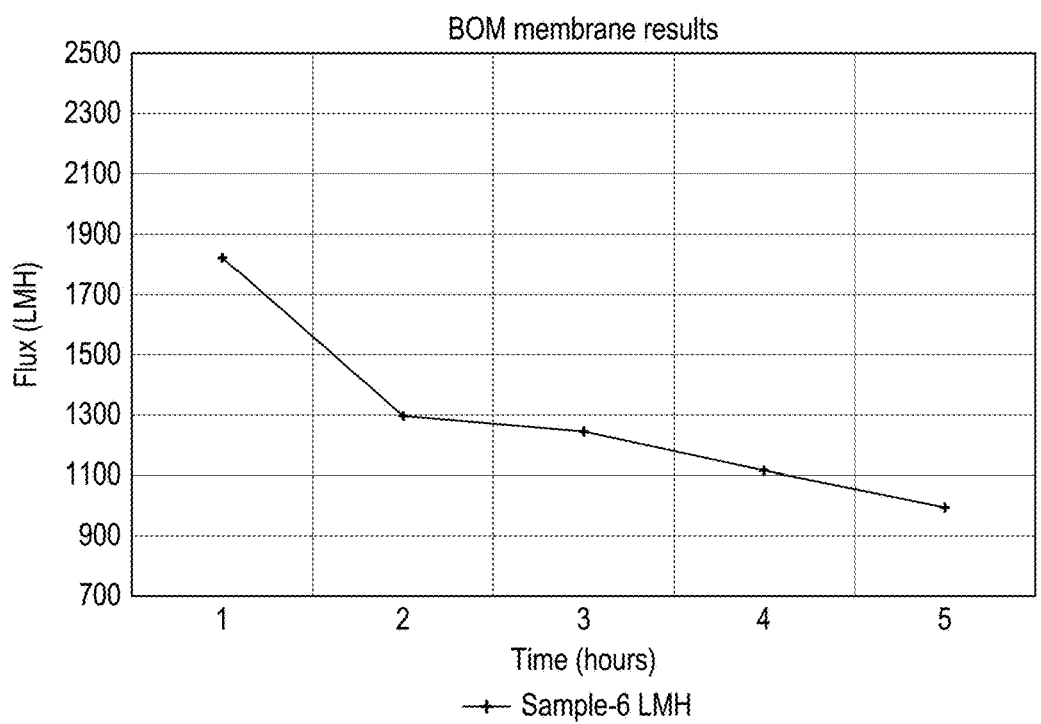
FIG. 15 depicts representation of the Flux behavior of the membrane sample-6 corresponding to the data in Table named under column HF Membrane-6 Flux summary, the sample was tested for PWP and CWF, the graph is extracted from for Figure-8 for the purpose of clarity. The graph shows that the initial PWP reading was recorded around 1800 LMH and then normalizing at a reading around 1000 LMH.
Figure 16:
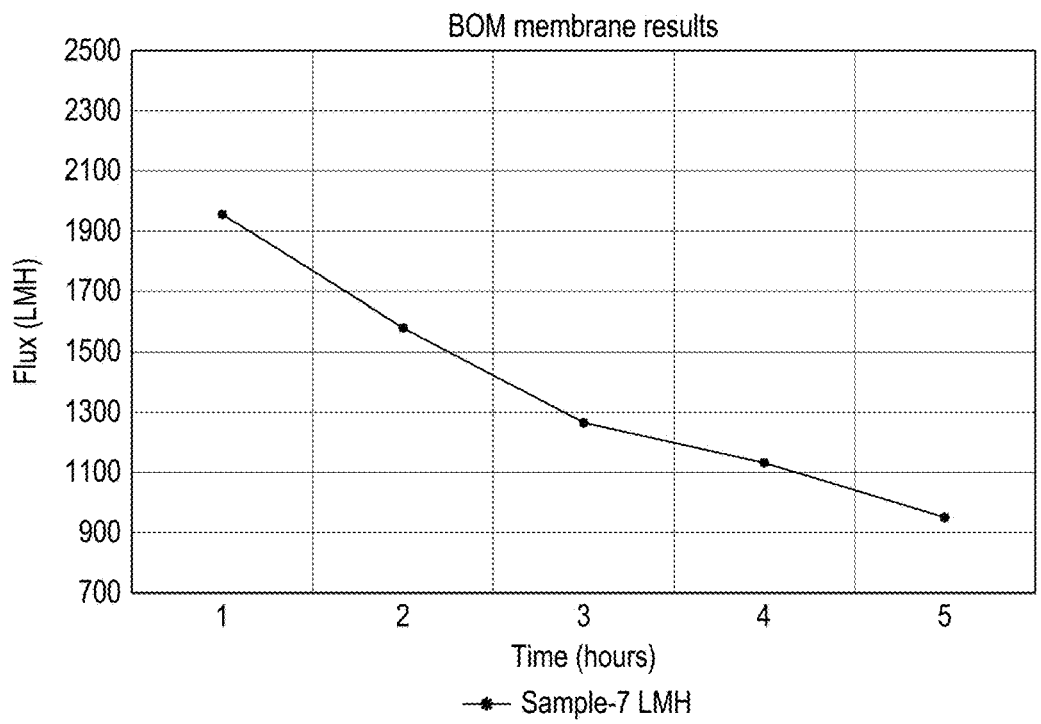
FIG. 16 depicts representation of the Flux behavior of the membrane sample-7 corresponding to the data in Table named under column HF Membrane-7 Flux summary, the sample was tested for PWP and CWF, the graph is extracted from for Figure-8 for the purpose of clarity. The graph shows that the initial PWP reading was recorded around 1930 LMH and then normalizing at a reading around 920 LMH.
Figure 17:
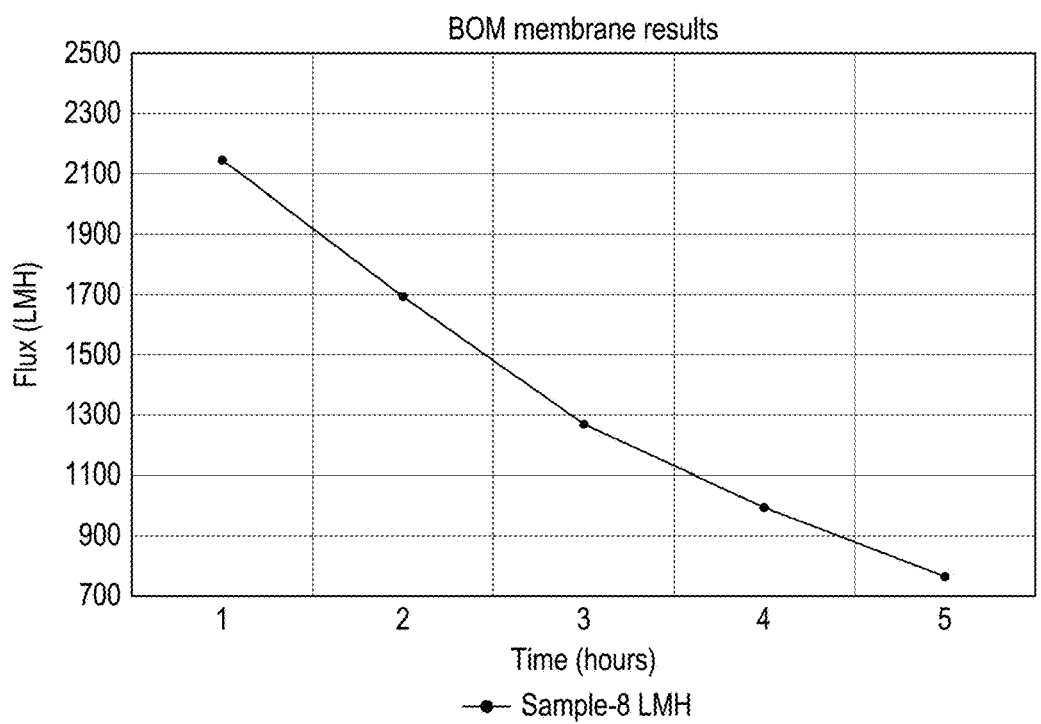
FIG. 17 depicts representation of the Flux behavior of the membrane sample-8 corresponding to the data in Table named under column HF Membrane-8 Flux summary, the sample was tested for PWP and CWF, the graph is extracted from for Figure-8 for the purpose of clarity. The graph shows that the initial PWP reading was recorded around 2100 LMH and then normalizing at a reading around 780 LMH.
Figure 18:
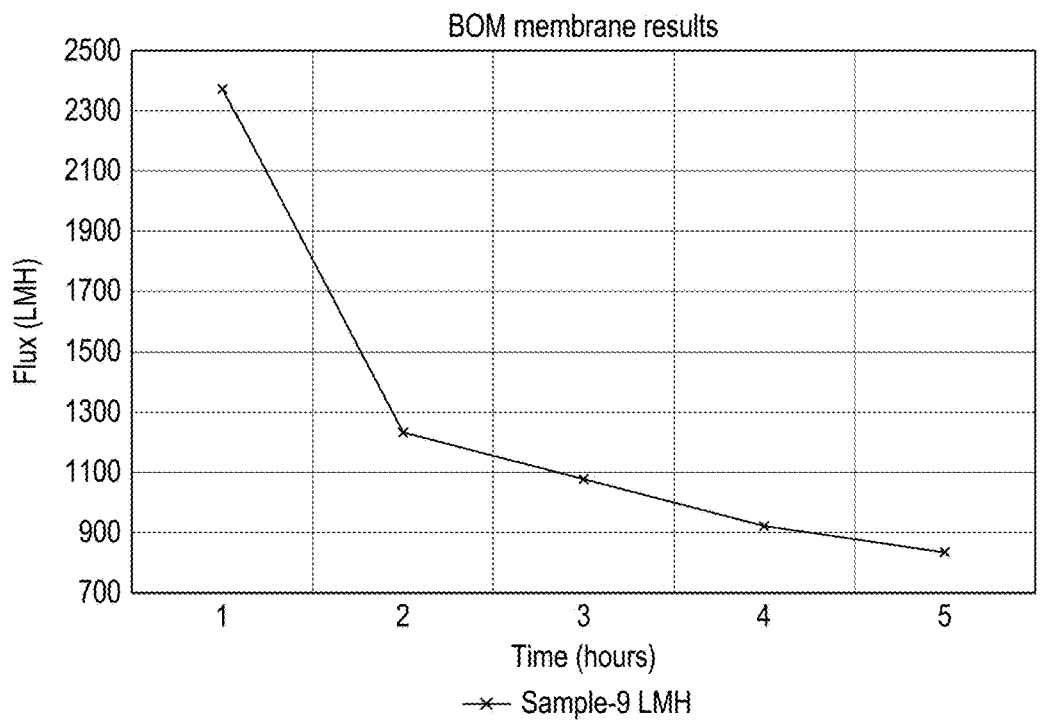
FIG. 18 depicts representation of the Flux behavior of the membrane sample-9 corresponding to the data in Table named under column HF Membrane-9 Flux summary, the sample was tested for PWP and CWF, the graph is extracted from for Figure-8 for the purpose of clarity. The graph shows that the initial PWP reading was recorded around 2370 LMH and then normalizing at a reading a little above 800 LMH.
Figure 19:
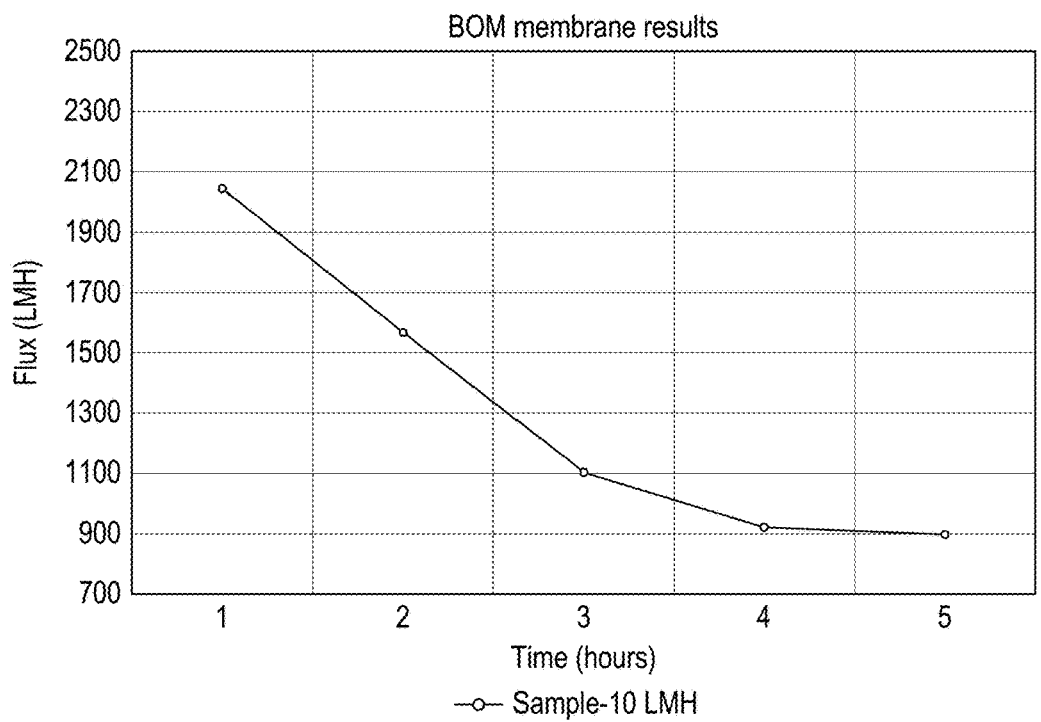
FIG. 19 depicts representation of the Flux behavior of the membrane sample-10 corresponding to the data in Table named under column HF Membrane-10 Flux summary, the sample was tested for PWP and CWF, the graph is extracted from for Figure-8 for the purpose of clarity. The graph shows that the initial PWP reading was recorded around 1800 LMH and then normalizing at a reading of 900 LMH.

The results can be found in the images of bacterial cultures grown on the Petri dishes and shown in the FIG. 9. The results are provided below.

The membrane was then tested for its ability to inhibit two types of bacterial strains (*Escherichia coli* ATCC 8739 (Gram−) and *Staphylococcus aureus* 6538 (Gram+)) using the standard international method for evaluating the antibacterial of the polymer surfaces. The results can be found in the images of bacterial cultures grown on the Petri dishes and shown in the FIG. 9. The results are provided below.

As can be seen, the zone of inhibition for the tests carried out on the spun polymeric fiber (ie the polymer with zinc salt embedded therein) match the geometry of the fiber sample placed on the petri dish; representing an almost complete kill of the bacteria on the portions of the disk to which the fiber was applied. This is confirmed by the CFU/ml reduction presented in Table 3 for the initial inoculum compared to that calculated for the spun polymer fiber.

Test Method:

A hollow fiber obtained by spinning the antibacterial polymer Polyethersulfone prepared as described above was tested to evaluate the effectiveness of the polymer against the main microbial strains defined by current legislation regarding plastic products intended to come into contact with the skin.

The product was tested for 2 types of bacterial strains (*Escherichia coli* ATCC 8739 (Gram−) and *Staphylococcus aureus* ATCC 6538 (Gram+)) using the standard international method for evaluating the antibacterial activity of non-porous plastic surfaces.

Moulded Initial Incubation Control polymer MICROBIAL inoculum at 37° C. inoculum item Reduction STRAINS (cfu/ml) for 24 h (cfu/ml) (cfu/ml) log Reduction % *Escherichia* $2.5 \times 10^6$ $6.2 \times 10^7$ $1.0 \times 10^7$ 0.79 83.87% *coli Staphylococcus* $1.7 \times 10^6$ $2.3 \times 10^7$ $1.4 \times 10^6$ 1.2 93.91% *Aureus*

The initial bacterial suspensions were diluted so as to obtain a known bacterial concentration expressed in colony forming units—cfu/ml. The fibers analyzed were duly sectioned in order to produce pieces of optimal dimensions for conducting the tests. These were treated with the reference microbial strains, covered with sterile polyethylene film and placed in an incubator at a temperature of 37±1° C. for 24 hours. At the end of the incubation period the samples were washed with neutralizing solution, on which the residual microbial count was determined.

TABLE 3

| Microbial Strains | Initial inoculum (cfu/ml) | | Control inoculum (cfu/ml) | Spun polymeric fiber | Reduction log | Reduction % |
|---|---|---|---|---|---|---|
| *Escherichia coli* | $2.5 \times 10^5$ | Incubation at | $6.2 \times 10^7$ | $1.0 \times 10^4$ | 3.1 | 99.9 |
| *Staphylococcus* | $1.7 \times 10^5$ | 37 degree Celsius for 24 hours | $2.5 \times 10^7$ | $1.4 \times 10^4$ | 2.9 | 99.9 |

The results obtained show that after 24 hours of incubation at 37° C. the polymer treated with zinc reduces the bacterial count by 83.870 (in the case of *Escherichia coli*) and 93.91% (in the case of *Staphylococcus aureus*).

FIG. 9. Explanation:

As can be seen from the figure that there are 6 petri dishes in total in two sets of 3 each. The 3 on top have a substance impregnated with silver Nano-particles to give the substance a biocidal property and the 3 below have the sample extracted from the fiber surface of the present invention (spun hollow fiber membranes). It can be seen that the Nano-particles have leached out in the above 3 petri dishes migrating/leaching out of the substance to kill the bacteria around the sample. However the bacterial growth in the lower 3 petri dishes is only inhibited at the surface if the sample which substantiates the claim that the substance responsible for imparting antimicrobial property does not leach out of the material of the present invention.

We claim:

1. A process for preparing an intrinsically anti-microbial hollow fiber membrane comprising a polymer or polymer mix dope solution absent an anti-microbial substance, wherein the dope solution comprises 3% to 25% polyethersulfone, 5% to 15% polyvinylpyrrolidone, 0 to 40% polyethylene glycol, 40% to 80% N-methyl pyrrolidone solution; 3% to 25% polyethersulfone and 5% to 15% polyvinyl pyrrolidone; or the dope solution comprises an aqueous lithium chloride solution, polycarbonates, polyamides, and aqueous isopropyl or any combination thereof, wherein the percentages are in weight ratio; the process comprising the steps of:
   a) mixing an anti-microbial substance embedded polymer or anti-microbial substance embedded polymer mix with the polymer or a polymer mix dope solution absent of an anti-microbial substance with a pore former comprising polyethylene glycol and other additives, with a solvent for all constituents; and
   b) passing the mixture produced in step a) through a spinneret together with a nonsolvent for the polymers:
   wherein the anti-microbial substance is a metal oxide, metal salt or metal, and the embedded polymer or polymer mix is from 2-5% by weight of total polymers in the mixture formed in step a).
2. A process according to claim 1, wherein:
   step b) is carried out at a temperature of from 25 to 80° C.
3. A process according to claim 1, wherein:
   (a) the polymer or polymer mix with the anti-microbial substance comprises the polymer or polymer mix dope solution absent the anti-microbial substance with the anti-microbial substance added;
   (b) the anti-microbial substance has metal oxide particles physically embedded between polymeric chains;
   (c) the process produces intrinsically anti-microbial hollow fiber membranes comprising a plurality of porous hollow membrane fibers wherein liquid enters from outside of the fiber membrane and passes through the porous membrane into and along a lumen of the fibers, thereby retaining retentate outside of the membrane and filtered liquid flows out from a hollow end of the fiber.
4. The process of making an intrinsically anti-microbial hollow fiber membrane according to claim 1, wherein:
   (a) the polymer or a polymer mix of the dope solution absent of an anti-microbial substance is from 95-98% by weight of the fiber; and
   (b) the anti-microbial substance embedded polymer is polyethersulfone and the polymer or a polymer mix of the dope solution absent of an anti-microbial substance is polyethersulfone, the polymers being provided in a 3% to 97% weight ratio.

\* \* \* \* \*